US012792465B2

(12) United States Patent
Sarkar et al.

(10) Patent No.: US 12,792,465 B2
(45) Date of Patent: Nov. 10, 2026

(54) SYSTEM AND METHOD FOR PROVIDING FUNCTIONAL SAFETY OF CONTROLLERS IN A SOFTWARE DEFINED VEHICLE

(71) Applicant: Wipro Limited, Bangalore (IN)

(72) Inventors: Arnik Sarkar, Murshidabad (IN); Sayanshree Ghosh, Kolkata (IN)

(73) Assignee: WIPRO LIMTED, Bangalore (IN)

( * ) Notice: Subject to any disclaimer, the term of this patent is extended or adjusted under 35 U.S.C. 154(b) by 13 days.

(21) Appl. No.: 19/003,577

(22) Filed: Dec. 27, 2024

(65) Prior Publication Data

US 2026/0133879 A1 May 14, 2026

(30) Foreign Application Priority Data

Nov. 12, 2024 (IN) ............................ 202441087228

(51) Int. Cl.
*G06F 11/14* (2026.01)
*G06F 11/18* (2006.01)
*G06F 11/07* (2006.01)

(52) U.S. Cl.
CPC ........ *G06F 11/1428* (2013.01); *G06F 11/187* (2013.01); *G06F 11/0739* (2013.01); *G06F 2201/86* (2013.01)

(58) Field of Classification Search
CPC ............. G06F 11/0739; G06F 11/1428; G06F 11/187; G06F 2201/86
See application file for complete search history.

(56) References Cited

U.S. PATENT DOCUMENTS 5,957,985 A 9/1999 Wong et al.
8,099,179 B2 1/2012 Naik et al.
10,239,531 B2 3/2019 Kilmurray et al.
10,382,225 B2 * 8/2019 Dormiani .............. B64C 13/503
10,397,019 B2 8/2019 Hartung et al.
(Continued)

FOREIGN PATENT DOCUMENTS

KR 102546014 B1 6/2023
WO 2023007209 A1 2/2023
(Continued)

OTHER PUBLICATIONS

Abdoul Aziz Kane et al., "Elastic Gateway Functional Safety Architecture and Deployment: A Case Study", IEEE Access, vol. 10, pp. 91771-91801 (2022).
(Continued)

*Primary Examiner* — Joseph R Kudirka
(74) *Attorney, Agent, or Firm* — Finnegan, Henderson, Farabow, Garrett & Dunner, LLP

(57) ABSTRACT

A system and method for providing functional safety in a software defined vehicle (SDV) is disclosed. The system includes a Central Controller (CC), a plurality of Zonal Controllers (ZCs) coupled with the CC, and an Emergency Controller (EC) coupled to the CC and each of the plurality of ZCs. The CC or one of the plurality of ZCs is dynamically configurable as a shadow-VSM (SVSM) based on a determination of one of a plurality of modes of the SDV. The VSM is configured to monitor the EC and the plurality of ZCs, and the SVSM is configured to monitor the VSM to determine the one of the plurality of modes of the SDV.

15 Claims, 15 Drawing Sheets

(56) References Cited

U.S. PATENT DOCUMENTS

| | | | | |
|---|---|---|---|---|
| 2019/0258251 | A1 | 8/2019 | Ditty et al. | |
| 2024/0134730 | A1* | 4/2024 | Aneja | G06F 11/0772 |

FOREIGN PATENT DOCUMENTS

| | | | |
|---|---|---|---|
| WO | 2024071942 | A1 | 4/2024 |
| WO | 2024085580 | A1 | 4/2024 |

OTHER PUBLICATIONS

European Patent Office, Extended European Search Report in Patent Application No. EP 25160738.8 dated Aug. 25, 2025.

Torben Stolte et al., "A Taxonomy to Unify Fault Tolerance Regimes for Automotive Systems: Defining Fail-Operational, Fail-Degraded, and Fail-Safe," IEEE Transactions on Intelligent Vehicles, vol. 7, No. 2, DOI: 10.1109/TIV.2021.3129933, 13 pages, (2022).

* cited by examiner

SYSTEM AND METHOD FOR PROVIDING FUNCTIONAL SAFETY OF CONTROLLERS IN A SOFTWARE DEFINED VEHICLE

CROSS-REFERENCE TO RELATED APPLICATIONS

This application is a Non-Provisional Application, which claims priority to the Indian provisional patent application No. 202441087228, filed Nov. 12, 2024, entitled "SYSTEM AND METHOD FOR ENSURING FUNCTIONAL SAFETY IN A SOFTWARE DEFINED VEHICLE", which is hereby incorporated by reference in its entirety.

DESCRIPTION

Technical Field

This disclosure relates generally to operation of software defined vehicles, and more particularly to system and method for providing functional safety of controllers in a software defined vehicle.

Background

In recent years, modern automobiles have become increasingly dependent on embedded electronic systems which incorporate numerous Electronic Control Units (ECUs), sensors, bus systems, and advanced technologies such as cameras, radar, and lidar. These components collectively manage various vehicle functions, from essential control systems to sophisticated features like adaptive cruise control, collision avoidance, and automated parking, etc. In modern vehicles, there can be numerous ECUs, each dedicated to specific tasks. However, with the rise of high-performance computers (HPC) in the automotive industry, this traditional architecture is evolving. Instead of being managed by a multitude of ECUs, new vehicle architectures consolidate these functionalities into a number of HPCs which leads to a significant shift towards software-defined vehicles (SDVs).

Despite these advancements, providing the functional safety of SDVs presents new challenges. SDVs employ increased use of automation, connectivity, and electrification, and integrate data-center-level capabilities to support advanced features such as autonomous driving, infotainment systems, and real-time mapping, etc. The transition to software-defined architectures, where vehicle features are broken down into micro-services deployed on location-agnostic controllers, creates new points of potential failure. As vehicle functions become more dependent on complex software, the need for robust fault detection and recovery mechanisms grows significantly. Existing fail-safe systems focus primarily on fail-safe methods that ensure stopping of the vehicle in an event of a fault. However, such fail-safe methods lack a fault-operational approach that would allow continued safe operation after a fault is detected. Existing fail-safe systems for fault management in autonomous and software-defined vehicles may fall short in several critical areas. They often fail to provide sufficient redundancy across controllers and other essential components.

Therefore, there is a need for an efficient methodology to provide functional safety of controllers in a software defined vehicle.

SUMMARY OF THE INVENTION

In an embodiment, a system for providing functional safety of controllers in a software defined vehicle (SDV) is disclosed. The system may include a Central Controller (CC). The system may further include a plurality of Zonal Controllers (ZCs) coupled with the CC. The system may further include an Emergency Controller (EC) coupled to the CC and each of the plurality of ZCs. In an embodiment, the CC or one of the plurality of ZCs may be dynamically configurable as a Vehicle Safety Monitor (VSM) and one of the plurality of ZCs may be dynamically configurable as a shadow-VSM (SVSM), based on a determination of one of a plurality of modes of the SDV. In an embodiment, the VSM may be configured to monitor the EC and the plurality of ZCs and the SVSM may be configured to monitor the VSM to determine the one of the plurality of modes of the SDV.

In another embodiment, a method for providing functional safety of controllers in a software defined vehicle (SDV) is disclosed. The method may include determining one of a plurality of modes of the SDV based on monitoring, by a Vehicle Safety Monitor (VSM), an Emergency Controller (EC) and a plurality of Zonal Controllers (ZCs) of the SDV. The method may further include determining one of a plurality of modes of the SDV based on monitoring, by a Shadow-VSM (SVSM), the VSM. In an embodiment, the SDV may include a Central Controller (CC). In an embodiment, the plurality of ZCs may be coupled with the CC. In an embodiment, the EC may be coupled to the CC and each of the plurality of ZCs. In an embodiment, the CC or one of the plurality of ZCs may be dynamically configurable as the VSM and one of the plurality of ZCs may be dynamically configurable as the SVSM, based on the determination of the one of the plurality of modes of the SDV.

In yet another embodiment, a non-transitory computer-readable medium storing computer-executable instructions for providing functional safety of controllers in a software defined vehicle (SDV) is disclosed. The computer-executable instructions configured for dynamically configuring a Central Controller (CC) or one of a plurality of Zonal Controllers (ZCs) as a Vehicle Safety Monitor (VSM) and dynamically configuring one of the plurality of ZCs as a shadow-VSM (SVSM), based on a determination of one of a plurality of modes of the SDV. The computer-executable instructions may be further configured for monitoring, by the VSM, an Emergency Controller (EC) and the plurality of ZCs and monitoring, by the SVSM, monitoring the VSM to determine the one of the plurality of modes of the SDV. In an embodiment, the SDV may include the CC, the plurality of ZCs coupled with the CC, and EC coupled to the CC and each of the plurality of ZCs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. Further, the phrases "in some embodiments," "in accordance with some embodiments," "in the embodiments shown," "in other embodiments," and the like, mean a particular feature, structure, or characteristic following the phrase is included in at least one embodiment of the present disclosure and may be included in more than one embodiment. In addition, such phrases do not necessarily refer to the same embodiments or different embodiments.

Figure 1:
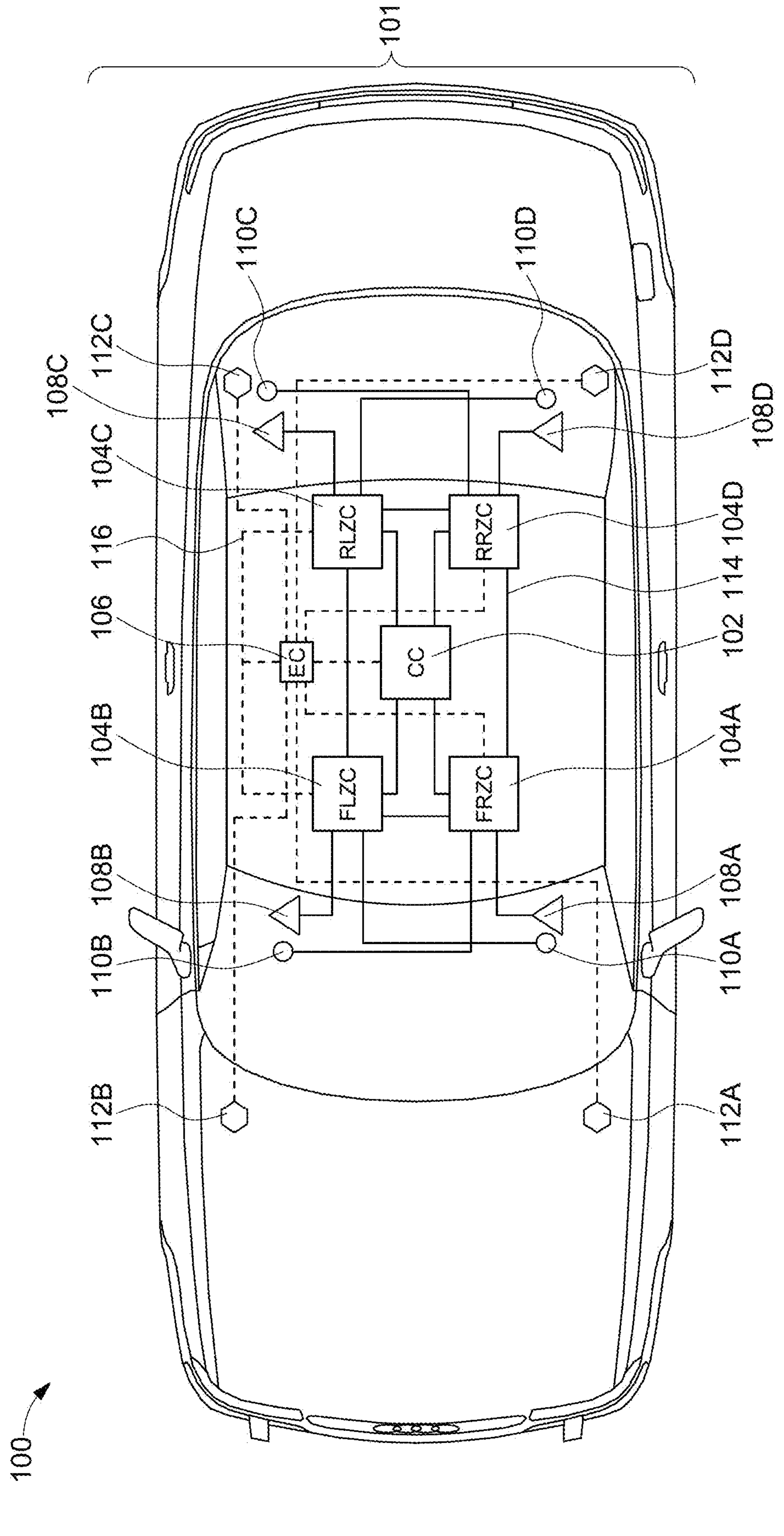
FIG. 1 is a block diagram of an exemplary system for providing functional safety of controllers in a software defined vehicle, in accordance with an embodiment of the present disclosure.

Referring now to FIG. 1, a block diagram of an exemplary system 100 for providing functional safety of controllers in a software defined vehicle (SDV) 101 is illustrated, in accordance with an embodiment of the present disclosure. The system 100 is based on a software-defined vehicle (SDV) architecture, which distributes functionality across multiple high-performance computing (HPC) controllers and implements a service-oriented architecture (SOA) for fault management. The system 100 is designed to ensure functional safety and fault-tolerance, particularly in advanced driving assistance systems (ADAS) and autonomous driving (AD) environments.

Figure 2A:
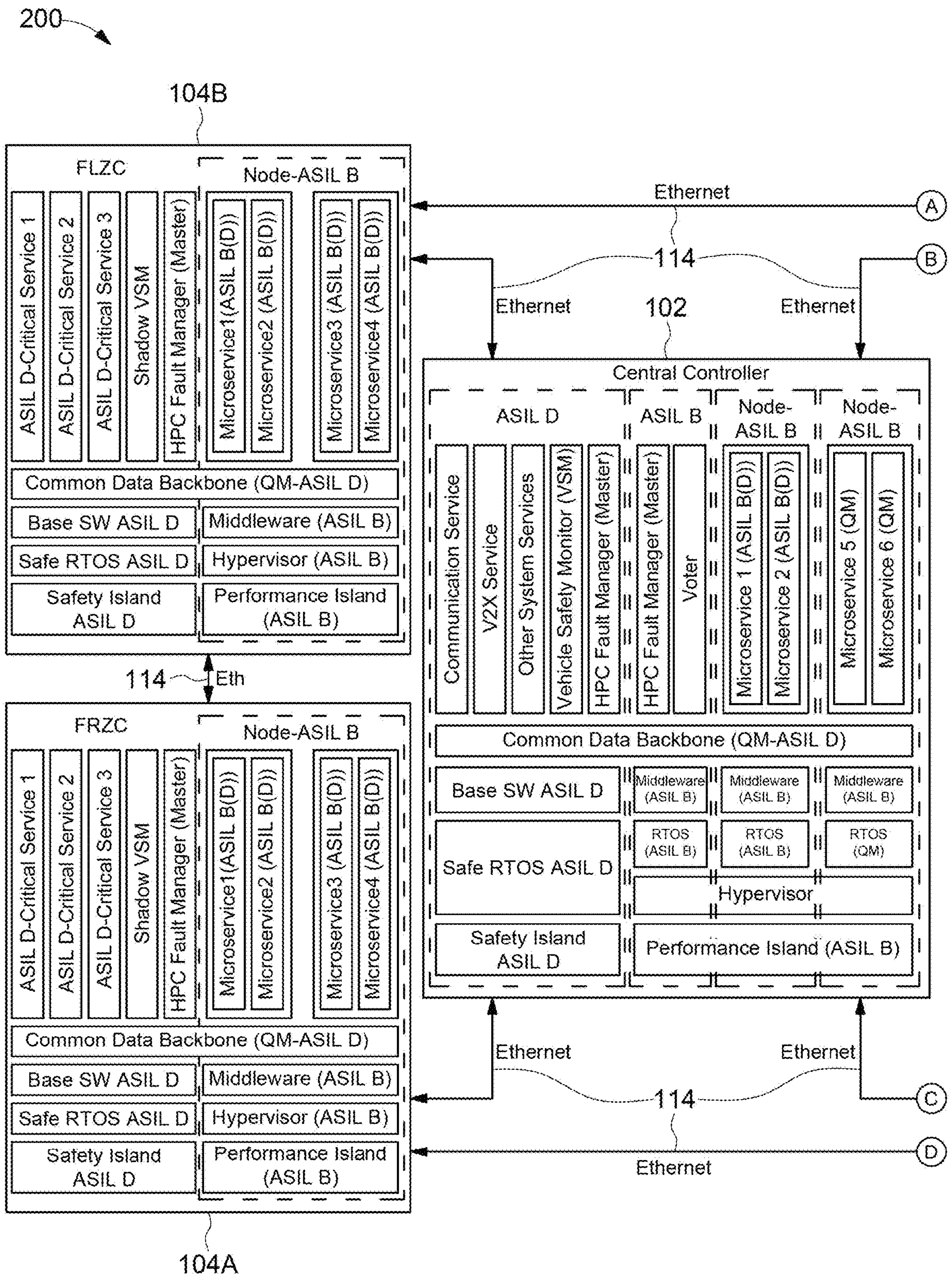
FIG. 2A and FIG. 2B illustrate a structural diagram of the system including a plurality of HPCs of FIG. 1, in accordance with an embodiment of the present disclosure.
Figure 2B:
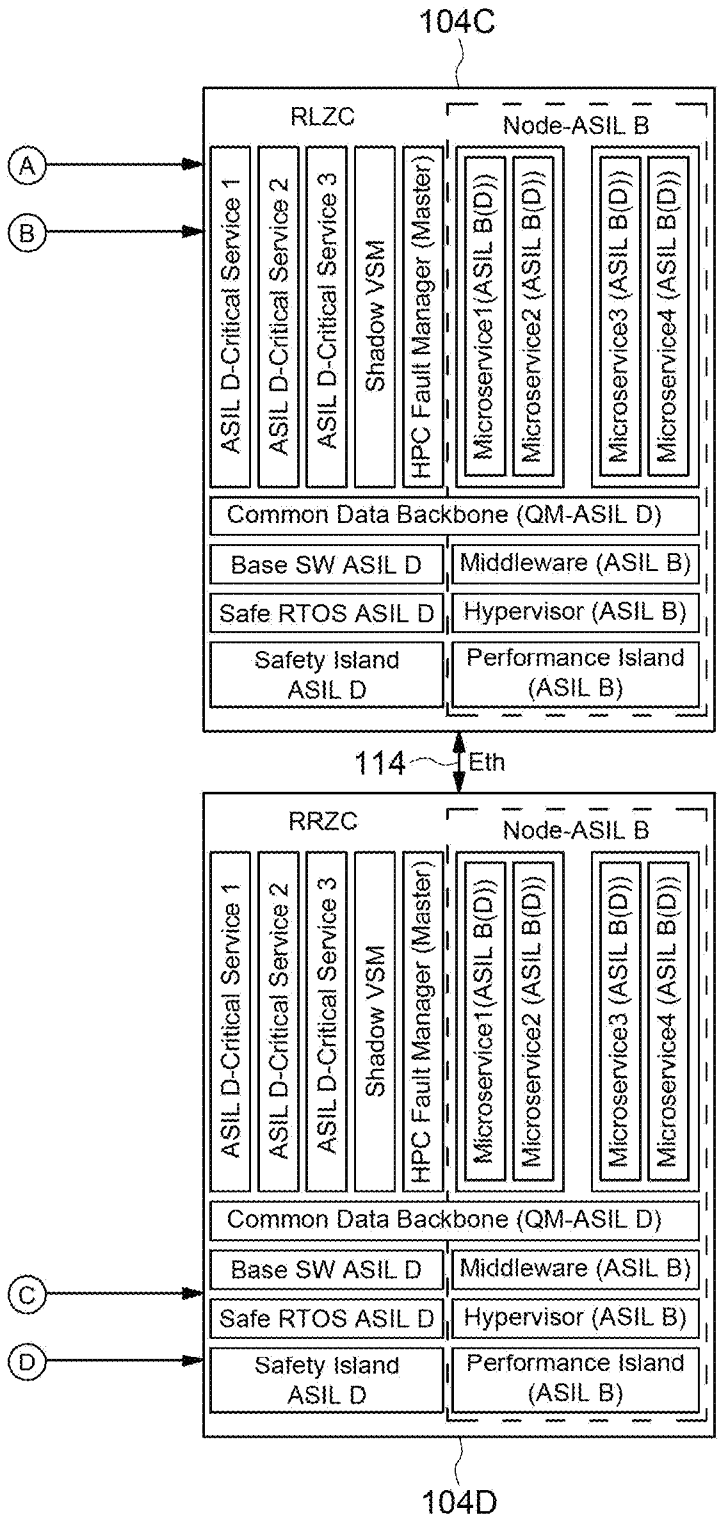

The SDV 101 may have a set of zones. As shown in FIG. 1, the set of zones may include a front left zone, a front right zone, a rear right zone, and a rear left zone. The SDV 101 may include a plurality of High-Performing Controllers (HPCs), a microcontroller, a plurality of Primary Sensors (PSs), a plurality of Secondary Sensors (SSs), a plurality of Tertiary Sensors (TSs), a plurality of network bus, and a plurality of power sources. Referring now to FIG. 2A and FIG. 2B, a structural diagram 200 of the system 100 including a plurality of HPCs of FIG. 1, is illustrated, in accordance with an embodiment of the present disclosure. FIG. 2A and FIG. 2B are explained in conjunction with FIG. 1. The plurality of HPCs may include a Central Controller (CC) 102, a plurality of Zonal Controllers (ZCs) 104A-104D. An emergency controller (EC) 106 may be configured as the microcontroller. The EC 106 may be coupled to the CC 102 and with each of the plurality of ZCs.

Each of the plurality of ZCs 104A-104D may be categorized into one of the set of zones. The plurality of ZCs 104A-104D may include a front right zonal controller (FRZC) 104A, a front left zonal controller (FLZC) 104B, a rear left zonal controller (RLZC) 104C, and a rear right zonal controller (RRZC) 104D. The FRZC 104A from the plurality of ZCs 104A-104D may be categorized into the front right zone of the SDV 101. The FLZC 104B from the plurality of ZCs 104A-104D may be categorized into the front left zone of the SDV 101. The RLZC 104C from the plurality of ZCs 104A-104D may be categorized into the rear left zone of the SDV 101. The RRZC 104D from the plurality of ZCs 104A-104D may be categorized into the rear right zone of the SDV 101.

Referring back to FIG. 1, the plurality of primary sensors may include front right primary sensors (FRPS) 108A, front left primary sensors (FLPS) 108B, rear left primary sensors (RLPS) 108C, rear right primary sensors (RRPS) 108D. The plurality of secondary sensors may include front right secondary sensors (FRSS) 110A, front left secondary sensors (FLSS) 110B, rear left secondary sensors (RLSS) 110C, rear right secondary sensors (RRSS) 110D. The plurality of tertiary sensors may include front right tertiary sensors (FRTS) 112A, front left tertiary sensors (FLTS) 112B, rear left tertiary sensors (RLTS) 112C, rear right tertiary sensors (RRTS) 112D. The plurality of network bus may include a primary network bus 114, and a secondary network bus 116. The plurality of power sources may include a primary power source (not shown) and a secondary power source (not shown).

The FRPS 108A, the FRSS 110A, and the FRTS 112A correspond to the front right zone of the SDV 101. The FLPS 108B, the FLSS 110B, and the FLTS 112B correspond to the front left zone of the SDV 101. The RLPS 108C, the RLSS 110C, and the RLTS 112C correspond to the rear left zone of the SDV 101. The RRPS 108D, the RRSS 110D, and the RRTS 112D correspond to the rear right zone of the SDV 101. Each of the FRTS 112A, the FLTS 112B, the RLTS 112C, and the RRTS 112D are communicably coupled to the EC 106.

The CC 102 is the primary control unit in the SDV 101. The CC 102 is responsible for monitoring and managing the overall state of the SDV 101. Each of the FRZC 104A, the FLZC 104B, the RLZC 104C, and the RRZC 104D are communicatively coupled with each other and with the CC 102 via the primary network bus 114. The EC 106 is communicatively coupled with each of the FRZC 104A, the FLZC 104B, the RLZC 104C, the RRZC 104D and the CC 102 via the secondary network bus 116. The CC 102 monitors an operational state of each of the plurality of ZCs 104A-140D, as well as the EC 106. The EC 106 may be configured to activate when the SDV 101 experiences critical faults that may not be resolved by a respective ZC from the plurality of the ZCs 104A-104D or the CC 102.

By default, the CC 102 is configured as a Vehicle Safety Monitor (VSM) and one of the plurality of ZCs 104A-104D may be configured as a shadow-VSM (SVSM) configured to monitor an operational state of the CC 102. The VSM may be configured to run critical micro-services, such as voter service that aggregates data from the each of the FRZC 104A, the FLZC 104B, the RLZC 104C, and the RRZC 104D. The VSM may be configured to periodically receive heartbeat signals from each of the plurality of ZCs 104A-104D as well as the EC 106 in order to monitor the plurality of ZCs 104A-104D and the EC 106. The SVSM may be configured to periodically receive heartbeat signals from the VSM (i.e., the CC 102) in order to monitor the VSM.

The VSM may determine one of a plurality of modes of the SDV 101 by monitoring the EC 106 and each of the plurality of ZCs of the SDV 101. The VSM may determine the one of the plurality of modes of the SDV 101 based on not receiving the heartbeat signals by the VSM from at least one of each of the plurality of ZCs 104A-104D or the EC 106. Alternatively, the SVSM may determine the one of the plurality of modes of the SDV 101 by monitoring the VSM (i.e., the CC 102). The SVSM may determine the one of the plurality of modes of the SDV 101 based on not receiving the heartbeat signals by the SVSM from the VSM. The CC 102 or one of the plurality of ZCs 104A-104D may be dynamically configurable as the VSM and one of the plurality of ZCs 104A-104D may be dynamically configurable as the SVSM, based on the determination of the one of the plurality of modes of the SDV 101.

In an embodiment, the one of the plurality of modes of the SDV 101 may be determined to be a normal mode upon detection of the EC 106, the CC 102, and the plurality of ZCs 104A-104D as operational. In the normal mode, the CC 102 may be dynamically configured as the VSM, and one of the plurality of ZCs 104A-104D may be dynamically configured as the SVSM. In an embodiment, the one of the plurality of modes of the SDV 101 may be determined to be an emergency mode upon detection of the EC 106 as faulty, by the VSM. In the emergency mode, the CC 102 configured as the VSM may dynamically be configured as the EC 106 and the VSM, and one of the plurality of ZCs 104A-104D may be dynamically configured as the SVSM. Alternatively, the one of the plurality of modes of the SDV 101 may be determined to be the emergency mode upon detection of all ZCs corresponding to one zone from the set of zones as faulty. In the emergency mode, the CC 102 may be dynamically configured as the VSM, and one of the plurality of ZCs 104A-104D corresponding to remaining zones from the set of zones may be dynamically configured as the SVSM. In an embodiment, the one of the plurality of modes of the SDV 101 may be determined to be a degraded mode upon detection of one ZC corresponding to each of the set of zone as faulty. In the degraded mode, the CC 102 may be dynamically configured as the VSM, and one of operational ZCs corresponding to each of the set of zones may be dynamically configured as the SVSM. In an embodiment, the one of the plurality of modes of the SDV 101 may be determined to be a fault-operational mode upon detection of the CC 102 as faulty. In the fault-operational mode, one of the plurality of ZCs 104A-104D may be dynamically configured as the VSM, and one of remaining ZCs from the plurality of ZCs 104A-104D may be dynamically configured as the SVSM. Alternatively, the one of the plurality of modes of the SDV may be determined to be the fault-operational mode upon detection of the CC 102 and the EC 106 as operational and one of the plurality of ZCs 104A-104D as faulty. In the fault-operational mode, in case the one of the ZCs configured as SVSM as faulty, the CC 102 may be dynamically configured as the VSM and one of remaining ZCs from the plurality of ZCs may be dynamically configured as the SVSM.

In an embodiment, each of the plurality of ZCs 104A-104D may also serve as a hub for data collection in its respective zone from the set of zones of the SDV 101, and each of the plurality of ZCs 104A-104D processes sensor data of their corresponding zone and transmits the processed sensor data to the CC 102 for further analysis. The FRPS 108A, the FLPS 108B, the RLPS 108C, and the RRPS 108D are connected to a nearest ZC from the ZCs 104A-104D and serve as the main data sources for Advanced Driver Assistance Systems (ADAS) and Autonomous Driving (AD) functionality of the SDV 101. It is to be noted that FRPS 108A is communicatively coupled with the FRZC 104A, the FLPS 108B is communicatively coupled with the FLZC 104B, the RLPS 108C is communicatively coupled to the RLZC 104C, and the RRPS 108D is communicatively coupled to the RRZC 104D. In an embodiment, the FRPS 108A, the FLPS 108B, the RLPS 108C, and the RRPS 108D may include, but is not limited to, components like cameras, radar, and lidar systems, etc.

The FRSS 110A, the FLSS 110B, the RLSS 110C, and the RRSS 110D may be utilized to provide hardware redundancy to the SDV 101. Each of the set of SSs 110A-110D is connected to a next to the nearest ZC from the plurality of ZCs 104A-104D as a backup of the plurality of primary sensors 108A-108D. It is to be noted that, the FRSS 110A is connected to the FLZC 104B, the FLSS 110B is connected to the FRZC 104A, the RLSS 110C is connected to the RRZC 104D, and the RRSS 110D is connected to the RLZC 104C. In an embodiment, the FRSS 110A, the FLSS 110B, the RLSS 110C, and the RRSS 110D ensure continuity of service if one of the plurality of primary sensors 108A-108D or their associated ZC from the plurality of ZCs 104A-104D fails due to faults.

The FRTS 112A, the FLTS 112B, the RLTS 112C, and the RRTS 112D provide a final layer of redundancy and are activated only in emergency situations when all the plurality of primary sensors 108A-108D and the plurality of secondary sensors 110A-110D have failed. Each of the FRTS 112A, the FLTS 112B, the RLTS 112C, and the RRTS 112D are communicatively coupled to the EC 106. In an embodiment, the tertiary sensors 112A-112D may include, but are not limited to, proximity sensors and ultrasonic sensors, etc., and are used primarily to safely stop the SDV 101.

The primary network bus 114 may be, but is not limited to, an ethernet bus which may utilize, but is not limited to, Time-Sensitive Networking (TSN) protocol. The primary network bus 114 provides communication channel between the CC 102, the plurality of ZCs 104A-104D, the primary sensors 108A-108D, and the plurality of secondary sensors 110A-110D. The primary network bus 114 ensures timely and reliable data transmission across the SDV 101 to support both safety and performance functions of the SDV 101. The secondary network bus 116 may be a CAN bus and may act as a backup communication channel, particularly between the EC 106 and the CC 102, the ZCs 104A-104D, the plurality of tertiary sensors 112A-112D in the event of the primary network bus 114 failure. The secondary network bus 116 may be configured as the primary network bus in emergency mode when the EC 106 assumes control of the SDV 101.

Figure 3:
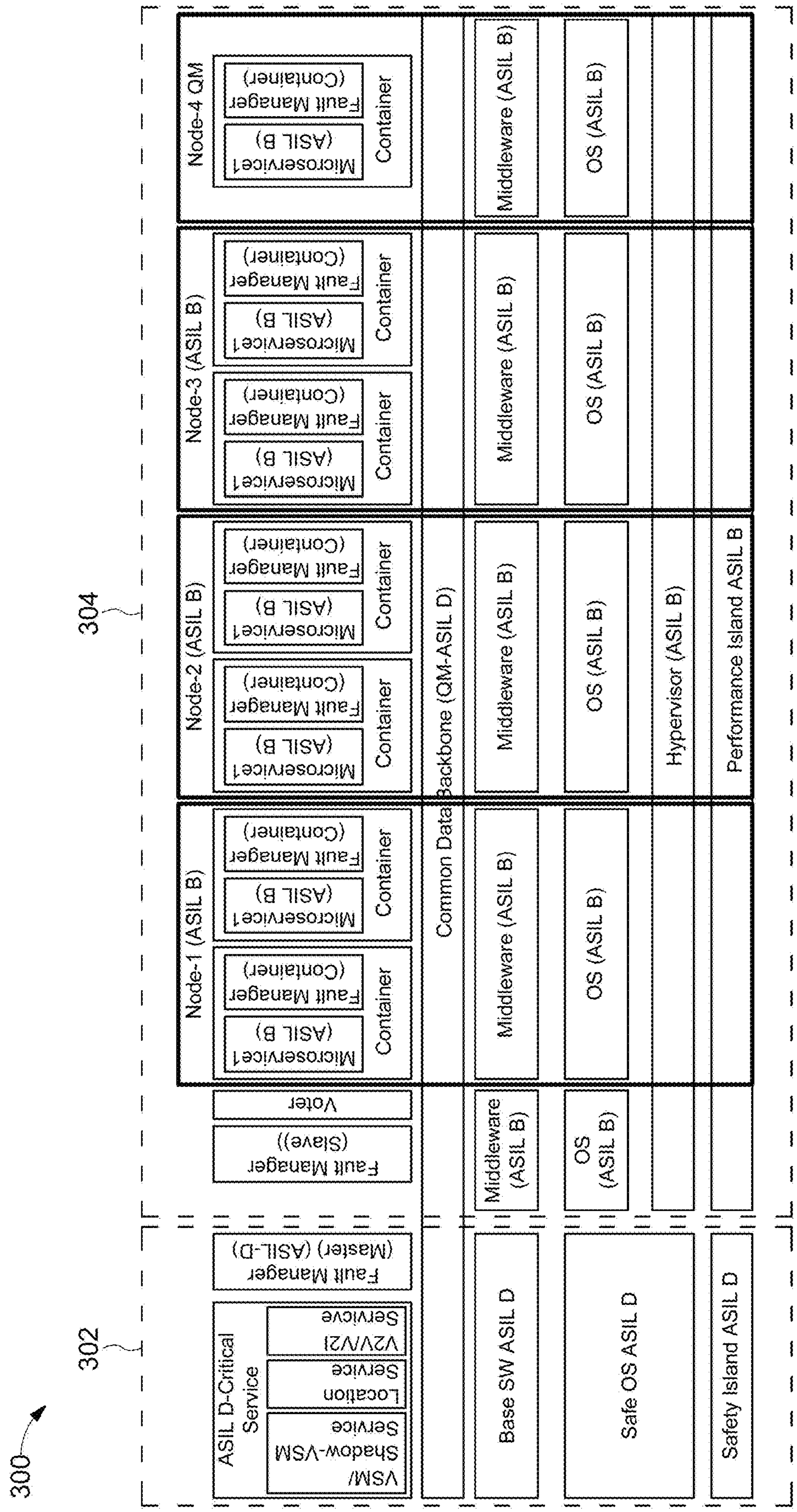
FIG. 3 illustrates a functional architecture of each of the plurality of HPCs of FIG. 1, in accordance with an exemplary embodiment of the present disclosure.

Referring now to FIG. 3, a functional architecture 300 of each of the plurality of HPCs of FIG. 1 is illustrated, in accordance with an exemplary embodiment of the present disclosure. The functional architecture 300 is designed to ensure fault tolerance and support critical functions in SDV 101. FIG. 3 is explained in conjunction with FIG. 1, FIG. 2A, and FIG. 2B. The CC 102 and the plurality of ZCs 104A-104D are all enabled as HPCs having the functional architecture 300. Each HPC within this system 100 may have similar functional architecture 300 but functionally play different roles depending on their utilization as the CC 102 or the plurality of ZCs 104A-104D.

The functional architecture 300 may be split into two major components including a safety island 302 and a performance island 304, both designed to process different levels of tasks based on their Automotive Safety Integrity Level (ASIL) requirements. The safety island 302 is dedicated to executing critical services with the highest ASIL rating (ASIL D). In an example, the safety island 302 is intended to handle tasks where any failure could lead to life-threatening situations. The Safe OS (Operating System) on the safety island 302 ensures compliance with ASIL D standards. Critical services such as Vehicle Safety Monitor (VSM) or a Shadow-VSM (SVSM) services, Location Services, Vehicle-to-Vehicle (V2V) services, and Vehicle-to-Infrastructure (V2I) services are executed on the safety island 302.

In case of emergency, the critical services running on the safety island 302 may help the SDV 101 to communicate a real-time location, fault types, and other crucial data of the SDV 101 to Original Equipment Manufacturer (OEM) service stations, nearby vehicles, and road infrastructure via the V2V/V2I communications systems. The VSM or the SVSM services running on the CC 102 and/or on the plurality of ZCs 104A-104D to monitor the safety of the SDV 101. Additionally, fault manager (master) is located within the safety island 302 of the plurality of HPCs to detect fault at the highest level (ASIL D) which covers critical faults in the entire HPC, including ASIL D-rated services.

The performance island 304 operates lower-rated ASIL tasks (ASIL B or below), including safety tasks at decomposed levels (QM, ASIL A, B, etc.). The performance island 304 is equipped with a Hypervisor (ASIL B), which is responsible for creating virtual environments in which multiple Operating System (OS) instances (e.g., Android, QNX) can operate independently. Each OS instance corresponds to a Node (Node-1, Node-2, etc.) and contains multiple Containers that host micro-services of the same ASIL classification (in this case, ASIL B). These containers ensure the separation of tasks based on their safety levels, avoiding interference between critical and non-critical tasks. The Common Data Backbone (CDB) facilitates communication between different nodes on the performance island 304. The CDB acts as a shared interface through which micro-services from various containers (e.g., Micro-service 1, Micro-service 2) interact with one another and process vehicle data from the sensors 108A-D, 110A-D, 112A-D, actuators (not shown), and control units 102, 104A-D, 106.

Micro-services are software units deployed within containers of the performance island 304. Micro-service 1 in each node might handle data acquisition from sensors such as cameras, LiDAR, RADAR, etc. Micro-service 2 may focus on processing the sensor data to perform tasks like object detection, classification, and decision-making, as required by the ADAS. To ensure the safety and integrity of vehicle operations, it is critical to maintain Freedom From Interference (FFI) between micro-services of different ASIL classifications. This is achieved by grouping micro-services with the same ASIL ratings and deploying them within containers of a particular node of the performance island 304 of the functional architecture 300. For instance, all micro-services rated ASIL B are grouped and deployed in separate containers within a node that is equipped with an ASIL B-rated Operating System (OS) and middleware. This ensures that micro-services with different safety levels do not interfere with each other, promoting a high degree of functional safety.

Each node within the HPC cluster runs these containers in parallel, with different nodes (Node 1, Node 2, Node 3, etc.) handling the same ASIL group to provide redundancy and ensure system reliability. FIG. 3 illustrates how this isolation of micro-services is managed across the nodes, where, for example, ASIL B-rated micro-services are consistently grouped together within containers of ASIL B-rated nodes.

The SDV features, especially those with functional safety requirements up to ASIL D, are primarily executed by processing data gathered from various vehicle sensors. These features are decomposed into three main functions, each of which is assigned to corresponding software services (micro-services) that are deployed in containers of functional architecture 300. These functions include, but are not limited to, data acquisition service, perception service, and decision-making service. The data acquisition service involves gathering data from the environment of the SDV 101 through various sensors, including cameras, LiDAR, radar, steering angle sensors, external temperature sensors, etc. Micro-services in the plurality of Zonal Controllers (ZCs) 104A-104D are responsible for acquiring this sensor data. For example, Micro-service 1 in the Front Right Zonal Controller (FRZC) 104A collects data from both primary sensors (such as the Front Right Primary Sensor (FRPS) 108A) and secondary sensors (such as the Front Left Secondary Sensor (FLSS) 110B). This distributed data acquisition process allows the SDV 101 to perceive its surroundings accurately.

Once the data from the sensors is acquired, it needs to be processed to interpret the environment. The Perception Service is responsible for analyzing and processing the sensor data according to the specific vehicle feature's requirements. For instance, in Advanced Driver Assistance Systems (ADAS), this includes detecting and classifying objects such as other vehicles, pedestrians, and obstacles. These operations are handled by Micro-service 2, which runs on the respective HPC node. This service ensures that the vehicle's understanding of its environment is accurate and up to date, enabling safe decision-making.

After processing the data, the SDV 101 must decide on the appropriate course of action based on the perception results. The Decision-Making Service interprets the processed data and initiates necessary actions through the vehicle's actuators. This can include tasks like Adaptive Cruise Control (ACC), Lane Keep Assist (LKA), or other advanced driving features. Micro-service 3 on the HPC is responsible for making these decisions and executing them, ensuring the vehicle reacts to its environment in real-time, promoting safety and functionality.

While the Data Acquisition Service is generally executed at the Zonal Controller connected to the primary sensor (e.g., a Front Left Primary Camera (FLPC) as the FLPS 108B connected to the FLZC 104B), the Perception Service and the Decision-Making Service require a higher level of fault tolerance. To achieve this, these services are executed redundantly across at least two additional HPCs. This redundancy ensures that in the event of a fault in one HPC, other HPCs can continue processing the necessary services without interruption. For instance, while the FLPC service runs on FLZC 104B, the service for the Front Left Secondary Camera (FLSC) may be executed on FRZC 104A, thereby ensuring that data acquisition, perception, and decision-making are not reliant on a single controller. This approach of distributing micro-services across multiple HPCs ensures both redundancy and load balancing, further enhancing the fault tolerance and overall safety of the SDV 101.

The placement of micro-services within a particular functional architecture 300 of various controllers 102, 104A-D, 106 is based on their location and function within the vehicle 101. For example, vehicle features related to lane change detection and proximity detection, which are critical for front-facing ADAS functionalities, have multiple micro-services running on the HPCs of the FLZC 104B and the FRZC 104A. Conversely, the HPCs of the rear zone, i.e., the RLZC 104C and the RRZC 104D, may handle fewer micro-services for these features but are still essential for rear-facing functionalities such as backup cameras and rear collision detection. The distribution of micro-services based on vehicle positioning ensures that each zone of the vehicle has the computational resources needed to execute the associated safety-critical functions efficiently.

A Voter service may run in one of the HPC nodes (Node-1, Node-2, etc.) and ensures fault-tolerant execution of safety-critical tasks. It is to be noted that the critical services may redundantly be processed by at least three HPCs. The Voter service may compare outputs from the at least three HPCs to ensure their consistency. If all three outputs match, the system proceeds as normal. In the event of discrepancies, the Voter service may flag potential faults and triggers appropriate fault recovery processes by interacting with a Fault Manager (Slave) on the performance island 304.

At the most granular level, each container within the HPC, which houses micro-services or applications, is equipped with a fault manager (container). The fault manager (container) is responsible for detecting faults at the micro-service/application level. These faults may originate from issues such as micro-service misbehavior, failure in communication, or a sensor malfunction (both primary and secondary sensors). The fault manager (container) constantly monitors the health of micro-services and raises alerts when faults are detected.

The second level of fault management is performed by a fault manager (slave) of the functional architecture 300, which is responsible for supervising the HPC itself. The fault manager (slave) operates on the performance island 304 of the functional architecture 300. The supervising of the HPC includes monitoring critical components such as the performance island 304, hypervisor, and Operating System (OS) of the functional architecture 300. If fault is detected in any of these areas, the corresponding fault manager (slave) reports them to a fault manager (master) of the functional architecture 300. The corresponding fault manager (slave) also oversees the health of the HPC node and plays a key role in overall system stability.

At the highest level, the fault manager (master) supervises the functional architecture 300. The fault manager (master) runs on the safety island 302 of the functional architecture 300. The fault manager (master) is responsible for monitoring safety-critical components such as the safety island 302, ASIL D-rated services, and the voter service, which ensures consistency and correctness in decision-making across the system. The fault manager (master) also collects information from the fault manager (slave) to detect system-wide failures and ensure that safety protocols are followed in the event of a failure. When a fault is detected at the micro-service level, the corresponding fault manager (container) notifies the fault manager (slave), which further escalates the fault to the fault manager (master) for system-wide analysis and fault-handling strategies. The fault manager (slave) also independently checks the overall health of the HPC node, hypervisor, and other platform-level components of the functional architecture 300, alerting the fault manager (master) of any faults in those areas.

Figure 4:
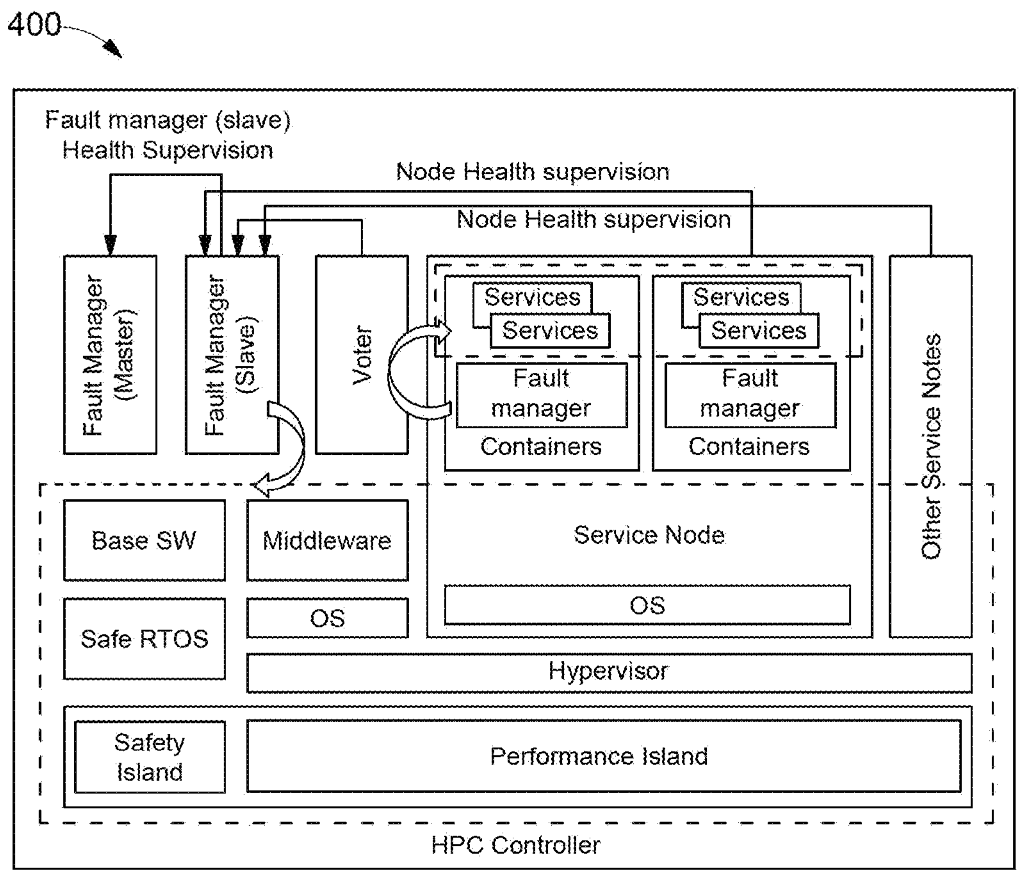
FIG. 4 illustrates fault monitoring in an HPC architecture of each of the HPCs of FIG. 3, in accordance with an embodiment of the present disclosure.

Referring now to FIG. 4, fault monitoring is depicted in the functional architecture 300 of each of the HPCs of FIG. 3, in accordance with an embodiment of the present disclosure. The functional architecture 300 depicts how fault management is performed across multiple levels of the HPC modules to ensure system integrity, real-time functionality, and compliance with functional safety standards, specifically Automotive Safety Integrity Levels (ASIL). The functional architecture 300 shows three distinct layers of fault managers that includes the fault manager (container), the fault manager (slave), and the fault manager (master) working together to monitor and maintain health of the HPC.

At the base of this functional architecture 300, the fault manager (container) is responsible for monitoring the individual containers within the HPC. Each container holds multiple micro-services that are associated with specific vehicle functions (e.g., sensor management, perception, and decision-making services, etc.). The fault manager (container) may monitor the health of these micro-services, detect faults at the application level, and reports these faults upwards to the fault manager (slave). The monitoring by the fault manager (container) includes alive supervision, deadlock supervision (temporal flow monitoring), logical supervision (program flow monitoring), and health status supervision. In the alive supervision, the fault manager (container) ensures all micro-services execute their tasks at the expected periodic intervals. In the deadlock supervision, the fault manager (container) verifies that operations within micro-services are completed in the expected timeframes to avoid stalling. In the logical supervision, the fault manager (container) ensures that operations follow the correct logical sequence to avoid unexpected behavior. In the health status supervision, the fault manager (container) monitors the health of the micro-services, including parameters like the Operating System (OS) state, input voltage, and more.

At HPC platform level of the functional architecture 300, the fault manager (slave) is responsible for monitoring key infrastructure components of the functional architecture 300, such as the performance island 304, hypervisor, and Operating System (OS). The fault manager (slave) also collects and process fault data from the fault manager (container) of each containers. The fault manager (slave) ensures the overall health of the node (where container resides) and provides alive supervision, deadlock supervision, and health status supervision. In alive supervision, the fault manager (slave) oversees the periodic operations at the HPC platform level. In deadlock supervision, the fault manager (slave) detects and address any platform-level timing issues. In health status supervision, the fault manager (slave) continuously monitors the health of the HPC node including its hypervisor, OS, hardware temperature, and other critical parameters. When a fault is detected, the fault manager (slave) reports the fault to the fault manager (master).

At the highest level, the fault manager (master) runs on the safety island 302 of the HPC and supervises the entire HPC to ensure safety-critical elements such as ASIL D-rated services, the voter service, and the overall system integrity. The fault manager (master) receives fault notifications from the fault manager (slave) and takes appropriate action to maintain system safety and functionality. The fault manager (master) monitors health supervision at the system level (safety island, voter service, etc.). The fault manager (master) ensures temporal and logical consistency across the entire HPC system.

Referring back to FIG. 1, the system 100 is responsible for managing vehicle-level faults through various components and control mechanisms to ensure the SDV 101 operates safely across different fault scenarios. The SDV 101 may incorporate a hierarchical structure that may include the plurality of High-Performing Controllers (HPCs), the microcontroller, the plurality of PSs, the plurality of SSs, the plurality of TSs, the plurality of network bus, and the plurality of power sources. The plurality of HPCs may include the Central Controller (CC) 102, the plurality of zonal controllers (ZCs) 104A-104D. The emergency controller (EC) 106 may be configured as the microcontroller. The plurality of ZCs 104A-104D may include the FRZC 104A, the FLZC 104B, the RLZC 104C, the RRZC 104D. Each of the plurality of ZCs 104A-104D periodically transmits a heartbeat signal to the VSM that is by default configured to run on the CC 102. The VSM monitors health of each of the plurality of ZCs 104A-104D by receiving heartbeat signals from each of the plurality of ZCs 104A-104D at regular time intervals. In turn, the CC 102 also transmits its own heartbeat signal to a SVSM running on a dynamically configured ZC from the plurality of ZCs. This redundancy ensures that if either one of the plurality of ZCs 104A-104D or the CC 106 fails to send a heartbeat signal to the VSM or the SVSM respectively, the VSM or the SVSM detects the failure in the one of the plurality of ZCs 104A-104D or the CC 106 promptly.

If the one of the plurality of ZCs 104A-104D fails to transmit the heartbeat signal, the VSM initiates a transition of one of the plurality of modes of the SDV 101 from the normal mode to the fault-operational mode to keep the SDV 101 operational while recovering from the failure. In the event that the VSM detects failures from more than one ZC from the plurality of ZCs 104A-104D, the VSM first checks if all the ZCs corresponding to one zone from the set of zone are detected as faulty. If this is the case, the VSM immediately transitions the SDV 101 to the emergency mode to ensure safety. However, if the failures occur across different zones, the VSM transitions the SDV 101 to the degraded mode which allows for partial functionality of the SDV 101. If another ZC failure occurs while the SDV 101 is in the degraded mode, the VSM escalates the SDV 101 to the emergency mode.

Additionally, the EC 106 of the SDV 101 also transmits its health status to the VSM by default configured on the CC 102 through regular heartbeat signals. A failure in the EC 106 may be detected when the heartbeat signals from the EC 106 is not received by the VSM. The VSM may assume the responsibility of the EC 106 and transitions the SDV 101 directly to the emergency mode. In this emergency mode, the VSM triggers a Safe Stop Planner (SSP) micro-service to ensure the SDV 101 halts safely.

As illustrated in FIG. 1, the SDV 101 may include the plurality of PSs 108A-108D, the plurality of SSs 110A-110D, and the plurality of TSs 112A-112D distributed across each of the set of zones of the SDV 101. The plurality of PSs 108A-108D may include the FRPS 108A, the FLPS 108B, the RLPS 108C, and the RRPS 108D. The plurality of SSs 110A-110D may include the FRSS 110A, the FLSS 110B, the RLSS 110C, and the RRSS 110D. The plurality of PSs 108A-108D and the plurality of SSs 110A-110D may provide critical data for vehicle navigation and operation. The plurality of ZCs 104A-104D contains a data acquisition micro-service, which performs plausibility tests on the raw sensor data received from the plurality of PSs 108A-108D. If the plausibility test identifies any fault in the data in one of the plurality of PSs 108A-108D, the fault manager (master) of one of the plurality of ZCs 104A-104D of that zone notifies the VSM about the sensor failure.

Upon receiving the notification of a fault in a primary sensor from the plurality of PSs 108A-108D, corresponding to a particular zone of the SDV 101, the VSM assesses the overall vehicle status and attempts to activate a secondary sensor from the plurality of SSs 110A-110D, corresponding to that particular zone of the SDV 101 as a backup. The VSM checks whether the secondary sensor from the plurality of SSs 110A-110D, is available at that particular zone. In cases where the secondary sensor is absent or has also failed, the VSM may trigger a transition to move the SDV 101 to the emergency mode, the VSM halts non-critical operations and prioritizes safety of the SDV 101 by initiating necessary actions through the SSP micro-service to safely stop the SDV 101.

Additionally, if one of the plurality of ZCs 104A-104D corresponding to one of the set of zones fails, one of remaining ZCs from the plurality of ZCs 104A-104D of another zone may take charge of the failed ZC. For instance, if the FLZC 104B fails, the FRZC 104A may assume responsibility by activating a secondary sensor in the front-left zone, such as the FLSS 110B. The FRZC 104A may then take over the tasks previously performed by the FLZC 104B to ensure continuous monitoring and control over the front-left zone. This reallocation of control is based on a dynamic priority assignment technique to ensure that the SDV 101 remains operational and maintains critical functionality while the VSM manages the fault recovery process. Similarly for example, if the RLZC 104C fails, the RRZC 104D may activate the necessary secondary sensor of the rear-left zone, such as the RLSS 110C and assume control of the rear-left zone.

As illustrated in FIG. 1, the SDV 101 may include the plurality of network bus. The plurality of network bus may include the primary network bus 114 and the secondary network bus 116. The plurality of network bus in the SDV 101 may utilize, but not limited to, a Time-Sensitive Networking (TSN) protocol, which provides redundancy and fault tolerance at the software level for communication between the plurality of ZCs 104A-104D and their connected sensors 108A-108D, 110A-110D, 112A-112D. The VSM continuously monitors the health of the primary network bus 114 based on the Time-Sensitive Networking (TSN) protocol. If a fault is detected in the primary network bus 114, indicating a loss of communication between the controllers or sensors, the VSM transitions the SDV 101 to the emergency mode. This action prevents further vehicle operation until the fault is resolved, as a functional network bus is critical for real-time sensor data acquisition and controller communication.

The SDV 101 may also include the plurality of power sources. The plurality of power source may include the primary power source and the secondary power source. The primary power source of the SDV 101 is monitored by a switch that may detect any anomalies or failures in the power system. Upon detection of a power source failure, the switch alerts the VSM, which then moves the SDV 101 to the degraded mode. In degraded mode, the SDV 101 operates with reduced capabilities to conserve power while ensuring the safety of its occupants. The VSM may also prioritize essential systems and shut down non-essential services to extend vehicle functionality until the SSP micro-service is executed or the fault is resolved.

Figure 5:
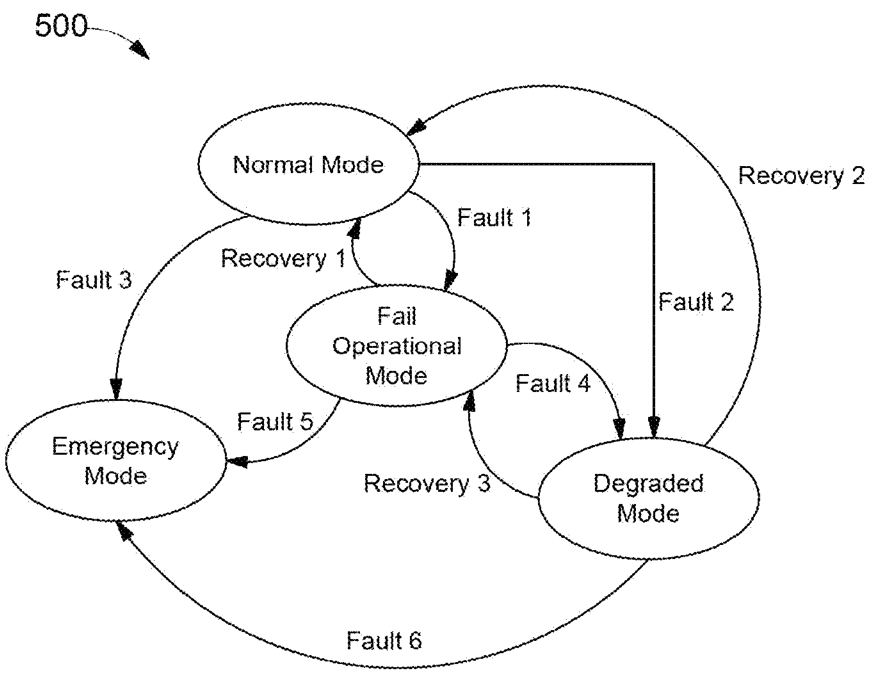
FIG. 5 illustrates a state diagram depicting transition of operation modes of the software defined vehicle, in accordance with an exemplary embodiment of the present disclosure.

Referring now to FIG. 5, a state diagram 500 depicting transition of operation modes of the SDV 101, is illustrated, in accordance with an exemplary embodiment of the present disclosure. The VSM manages the safety state of the overall SDV 101 by orchestration transitions between the set of modes of the SDV 101. The set of modes may include, but is not limited to, the normal mode, the fault-operational mode, the degraded mode, and the emergency mode. Each mode transition is based on specific fault detection conditions to ensure that the SDV 101 operates safely, even when failures occur within critical systems such as controllers, sensors, power system, or network bus.

The transitions between the set of modes of the SDV 101 are dictated by fault severity and system status, with recovery paths available depending on fault resolution. The set of modes of the SDV 101 are ordered from critical to most critical modes such as the normal mode, the fault-operational mode, the degraded mode, and the emergency mode. The VSM dynamically monitors the system 100 for faults and triggers mode transitions as required.

In the normal mode, the SDV 101 operates with full functionality after successfully passing a series of built-in-self-tests (BISTs) or startup tests. The SDV 101 remains in this mode unless a fault is detected in real-time operations. All vehicle components, including the plurality of HPCs, the plurality of sensors 108A-108D, 110A-110D, 112A-112D, the plurality of network buses, and the plurality of power sources, are fully operational, and the VSM continuously monitors the health of these components. The VSM by default operates on the CC 102, gathering system status and detecting faults to ensure ongoing normal operation. If any fault is detected, the SDV 101 transitions to an appropriate fallback mode as defined by the fault type.

When a fault is identified, the SDV 101 transitions from the normal mode to the fault-operational mode. Faults that lead to transition (i.e., Fault 1) include the failure of one of the plurality of ZCs 104A-104D or the failure of a primary sensor 108 or a secondary sensor 110. In the fault-operational mode, the SDV 101 continues to operate with all functionalities active, although the user is notified of the fault through display or audio notifications. The VSM monitors the system 100 for potential recovery, and if the fault is resolved, the VSM transitions the SDV 101 back to the normal mode via recovery 1 as shown in FIG. 5, which typically involves restarting the one of the plurality of ZCs 104A-104D.

The VSM transitions the SDV 101 to the degraded mode when multiple faults occur, or when a more severe fault compromises critical systems (i.e., Fault 2). This mode limits functionality of the SDV 101 to essential operations only. Examples include the failure of one ZC corresponding to each of the set of zone as faulty, a mismatch of one HPC output at the voter service, or a failure of the primary power source. In the degraded mode, the maximum speed of the SDV 101 may be limited, and non-critical systems such as in-vehicle infotainment (IVI) and rear-seat entertainment (RSE) are disabled. The user receives fault notifications, and depending on the outcome of system checks, the SDV 101 may either return to the fault-operational mode (via Recovery 3) or, if all faults are resolved, to the normal mode (via Recovery 2).

Emergency mode is the most critical safety state and is triggered when severe system failures occur, such as the failure of three or more HPCs, the failure of both the primary sensors 108A-108D and the secondary sensors 110A-110D of a particular ZC 104A-104D, or the failure of the EC 106 (i.e., Fault 3). In this mode, only essential vehicle functionalities required for a safe stop are operational. The VSM communicates with the EC 106 via the secondary network bus 116 to execute the SSP micro-service, which safely brings the SDV 101 to a halt using the plurality of tertiary sensors 112A-112D (e.g., proximity sensors). The emergency mode is irreversible, and once the SDV 101 enters this state, the SDV 101 cannot revert to the degraded mode, or the fault-operational mode, or the normal mode, the SDV 101 may only come out of the emergency mode after a successful restart.

The transitions between modes are governed by specific conditions based on the type and severity of the fault detected. Fault 1 triggers a transition of the SDV 101 from the normal mode to the fault-operational mode when a failure in one of the plurality of ZCs 104A-104D is detected, such as a missing heartbeat, or when a failure occurs in either the primary or secondary sensor. Fault 2 causes the SDV 101 to move from the normal mode to the degraded mode if one ZC corresponding to each of the set of zone as faulty], or if there is a failure in the primary power source or a mismatch of HPC output at the voter service. In more critical situations, Fault 3 triggers a transition of the SDV 101 from the normal mode to the emergency mode. This occurs when three or more HPCs fail, when both the primary sensors 108A-108D and the secondary sensors 110A-110D in a zone fail, when two ZCs 104A-104D fail within the same zone, or if a network bus fails.

The transition from the fault-operational mode to more critical modes also depend on fault detection. Detection of Fault 4 results in a shift from the fault-operational mode to the degraded mode when an additional HPC from a different zone fails, the primary power source fails, or an HPC output mismatch is detected at the voter service. If further critical faults are identified, such as additional HPC failures within the same zone or the failure of the EC 106, Fault 5 triggers a transition of the SDV 101 from the fault-operational mode directly to the emergency mode. Lastly, Fault 6 triggers a transition of the SDV 101 from the degraded mode to the emergency mode. This occurs if another HPC fails, the EC fails, or if both primary 108A-108D and secondary sensors 110A-110D of a ZC 104A-104D fail.

Recovery paths are provided based on the resolution of faults. Recovery 1 allows the SDV 101 to return from the fault-operational mode to the normal mode if the fault in one HPC is resolved by restarting the HPC. Recovery 2 facilitates the return from the degraded mode to the normal mode if the faults in both failed HPCs are resolved. Recovery 3 enables the SDV 101 to transition from the degraded mode back to the fault-operational mode if one of the failed HPCs is successfully restarted. These recovery mechanisms ensure that the SDV 101 may revert to safer operational modes when faults are addressed.

Referring back to FIG. 1, a mechanism for implementing fault tolerance at the SDV 101 is described to ensure that the SDV 101 remains operational even in the event of fault detection. The mechanism is designed to mitigate single points of failure within the plurality of ZCs 104A-104D through the use of the dynamic priority assignment technique, which governs the assignment of the VSM and the SVSM roles to active one of remaining ZCs from the plurality of ZCs 104A-104D. This redundancy mechanism allows the system 100 to quickly respond to failures and continue functioning safely.

In normal operation, the VSM runs on the CC 102, which is responsible for monitoring the plurality of ZCs 104A-104D across the SDV 101. Simultaneously, one of the plurality of ZCs 104A-104D is configured as the SVSM that runs in the background and monitors the health of the CC 102. For instance, the FLZC 104B can be assigned as the SVSM that may continuously check status of the CC 102 by monitoring heartbeat signals and communications from the CC 102. If the CC 102 fails to communicate with the FLZC 104B or the heartbeats of the CC 102 are lost, the FLZC 104B may assume the role of the VSM. Upon assuming the role of the VSM, the FLZC 104B may notify remaining ZCs of the plurality of ZCs 104A-104D to redirect their communications, including the periodic transmission of the heartbeat signals, to the FLZC 104B configured as the VSM instead of the CC 102. At this point, the FLZC 104B configured as the VSM triggers a transition of the SDV 101 from the normal mode to the degraded mode of operation to maintain functionality of the SDV 101 while accounting for the fault in the CC 102.

The dynamic priority assignment technique also allows flexibility in determining which HPC of the plurality of ZCs 104A-104D or EC 106 should take over as VSM and SVSM when a fault in one of the plurality of ZCs 104A-104D occurs. An Original Equipment Manufacturer (OEM) can define a specific priority order for selecting one of remaining ZCs of the plurality of ZCs to act as the VSM or perform other critical roles if the SDV 101 is no longer operating in the normal mode due to an HPC failure. In the event of such a failure, the one of the remaining HPCs, as per the dynamic priority assignment technique, may assume the responsibilities of the failed HPC and continue tasks such as fault monitoring, heartbeat signals exchange, and system control, etc. The dynamic priority assignment of roles ensures that the SDV 101 may remain operational despite faults in key computing units.

The dynamic priority assignment technique may vary from OEM to OEM, based on vehicle specifications. In an exemplary embodiment, in one configuration of the dynamic priority assignment technique, the following priority order is used by the OEM, the FLZC 104B has priority 1, the RLZC 104C has priority 2, the RRZC 104D has priority 3, and the FRZC 104A has priority 4, as will be explained in greater detail below in FIG. 6A, FIG. 6B, FIG. 6C and FIG. 6D.

Referring now to FIG. 6A, FIG. 6B, FIG. 6C and FIG. 6D architectural flow diagrams depicting fault tolerance mechanism for handling failures in the plurality of HPCs is illustrated, in accordance with the exemplary embodiment of the present disclosure. FIG. 6A, FIG. 6B, FIG. 6C and FIG. 6D depict four cases of controller failure scenarios and how the system 100 reassigns the role of the VSM and the SVSM based on the dynamic priority assignment technique.

Figures 6A, 6B, 6C, 6D:
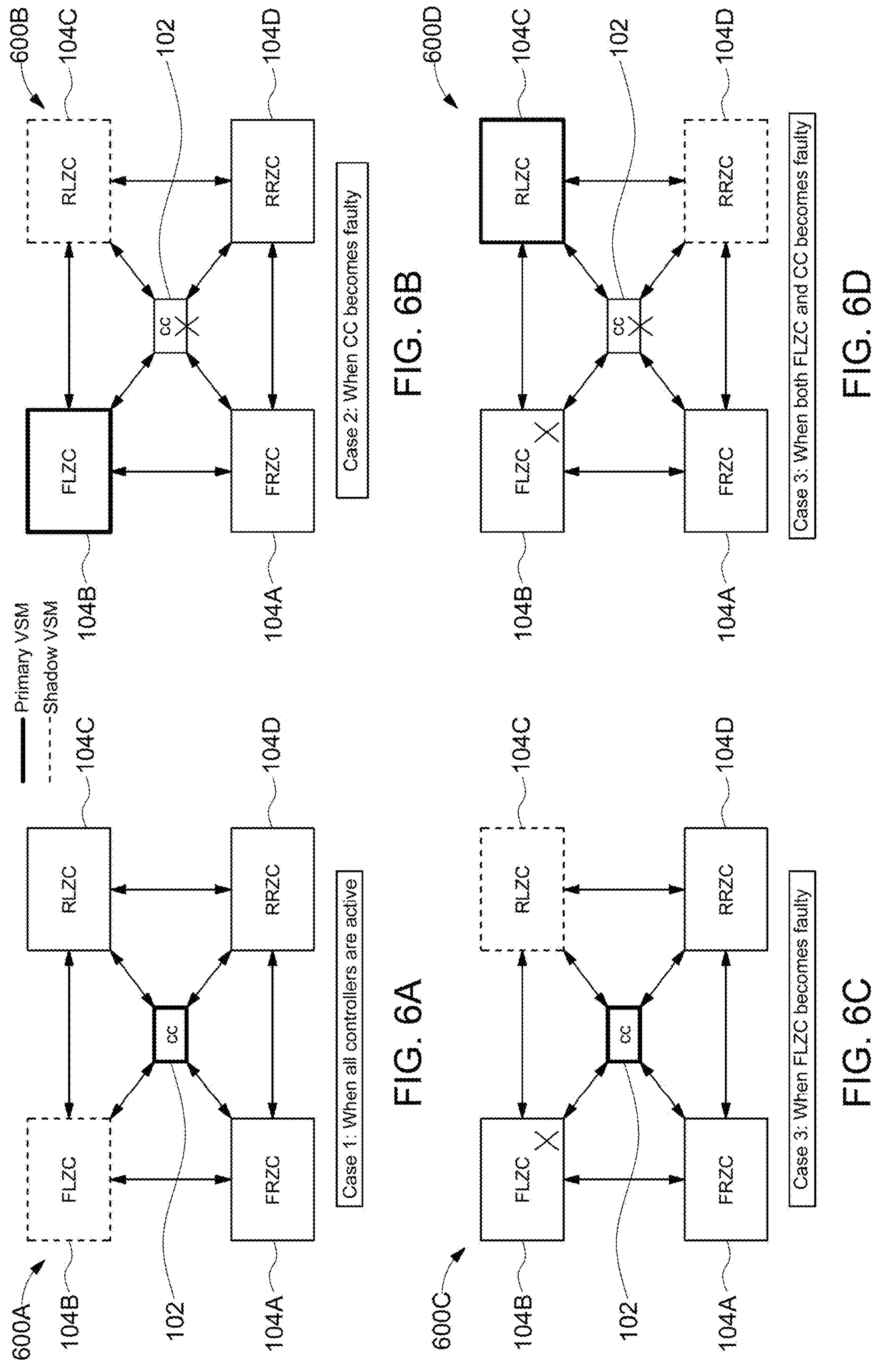
FIG. 6A, FIG. 6B, FIG. 6C and FIG. 6D depict architecture flow diagrams depicting fault tolerance mechanism for handling failures in the plurality of HPCs, in accordance with an exemplary embodiment of the present disclosure.

FIG. 6A depicts the plurality of ZCs 104A-104D communicably coupled to each other and the CC 106 of the SDV 101. Each of the plurality of ZCs 104A-104D are responsible for data acquisition from components at each of the set of zones of the SDV 101. The plurality of ZCs 104A-104D may include the FRZC 104A, the FLZC 104B, the RLZC 104C and the RRZC 104D. The CC 102 is typically responsible for overseeing the entire system 100 and configured as the VSM in normal operating mode. To ensure redundancy and fault tolerance, one of the plurality of ZCs 104A-104D is always configured as the SVSM for monitoring the CC 102 or the VSM. The SVSM is dynamically selected based on the dynamic priority assignment technique that can vary depending on the Original Equipment Manufacturer (OEM) specifications. In this exemplary embodiment, the one more ZC failure is not determined as faulty and may assign priority order to each of the plurality of ZCs 104A-104D as the FLZC 104B has priority 1, the RLZC 104C has priority 2, and the RRZC 104D has priority 3, the FRZC 104A has priority 4.

In flow diagram 600A depicted in FIG. 6A, when all HPCs are active, the CC 102 configured as the VSM, and the FLZC 104B configured as the SVSM because the FLZC 104B has the priority 1. The FLZC 104B monitors the health of the CC 102 by checking the heartbeat signals received from the CC 102. The plurality of ZCs 104A-104D are fully operational and communicate regularly with the CC 102. The SDV 101 remains in the normal operational mode as long as there are no detected faults in any of the plurality of HPCs. In general, the SDV 101 operates according to the first case after passing the checkups at startup.

In flow diagram 600B depicted in FIG. 6B, when the CC 102 becomes faulty as indicated by the "X" over the CC 102, the SVSM on the FLZC 104B dynamically configures the FLZC 104B from the SVSM to the VSM. The FLZC 104B takes over the role of monitoring and managing communications with remaining of the plurality of ZCs 104A, 104C, 104D. Since the SVSM has detected the failure of the CC 102, the FLZC 104B now configured as the VSM transitions the SDV 101 to the degraded mode, and the remaining of the plurality of ZCs 104A, 104C, 104D begin sending the heartbeat signals and their data to the FLZC 104B instead of the CC 102. Additionally, based on the dynamic priority assignment technique, one of remaining ZCs from the plurality of ZCs 104A-104D (in this case, the RLZC 104C having the priority 2) may be dynamically configured as the SVSM and the FLZC 104B may be dynamically configured as the VSM begins sending the heartbeat signals to the RLZC 104C.

In flow diagram 600C depicted in FIG. 6C, when the FLZC 104B becomes faulty while the CC 102 is still operational, as shown by the "X" over the FLZC 104B, the CC 102 configured as the VSM dynamically configures one of remaining ZCs from the plurality of ZCs 104A-104D as the SVSM according to the dynamic priority assignment technique. In this case, the RLZC 104C, which has the priority 2, takes over as the new SVSM. The RLZC 104C monitors the health of the CC 102 and prepares to step in as the VSM if the CC 102 also fails. The SDV 101 continues operating in the normal mode, with the CC 102 remaining the VSM and the RLZC 104C configured as the SVSM.

In flow diagram 600D depicted in FIG. 6D, when both the FLZC 104B and the CC 102 become faulty, as shown by the "X". The system 100 then dynamically configures one of remaining of the plurality of ZCs 104A-104D (in this case, the RLZC 104C) according to the dynamic priority assignment technique, to the role of the VSM. Other operational ZCs are now redirecting their communications to the RLZC 104C, which now assumes the role of VSM. The RLZC 104C (i.e., now configured as the VSM) then dynamically configures the RRZC 104D having the priority 3 as the SVSM according to the dynamic priority assignment technique. The RLZC 104C redirects its communications and the heartbeat signals to the RRZC 104D. The SDV 101 remains operational but in the degraded mode due to the dual failure of the FLZC 104B and the CC 102. This dynamic priority assignment technique ensures that the SDV 101 continues functioning while ensuring functional safety in the plurality of HPCs.

Figure 7B:
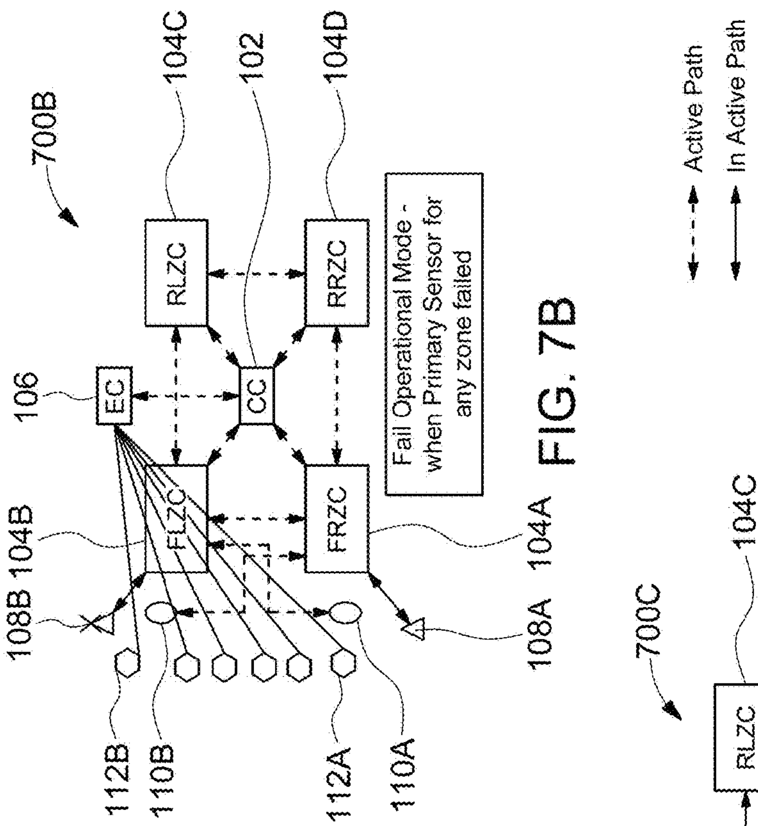
FIG. 7A, FIG. 7B and FIG. 7C illustrate sensor architecture flow diagrams depicting fault tolerance in multiple operational modes of the software defined vehicle, in accordance with an exemplary embodiment of the present disclosure.
Figure 7A:
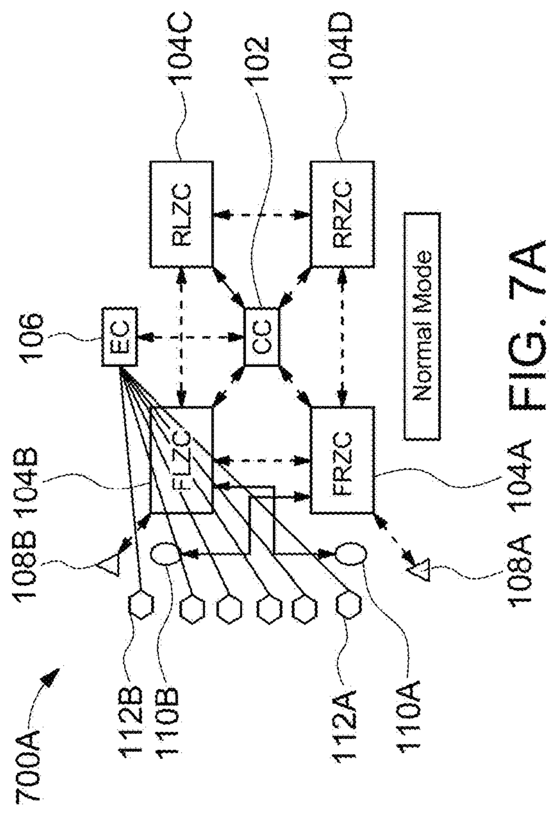
Figure 7C:
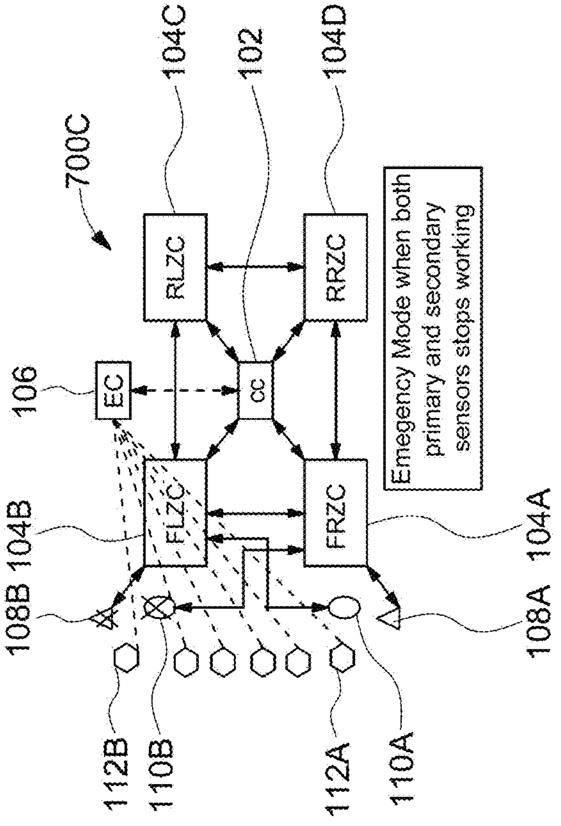

Referring now to FIG. 7A, FIG. 7B and FIG. 7C, sensor architecture flow diagrams 700A, 700B and 700C depicting fault tolerance in multiple operational modes of the SDV 101, are illustrated, in accordance with an exemplary embodiment of the present disclosure. The sensor architecture flow diagrams 700A, 700B and 700C showcases the connections and redundancy between primary sensors 108A-108D, secondary sensors 110A-110D, and tertiary sensors 112A-112D in both the zones of the SDV 101. The sensor architecture flow diagrams 700A, 700B and 700C highlight three operational modes including the normal mode, the fault-operational mode, and the emergency mode respectively, each corresponding to different sensor activation paths depending on fault conditions.

In normal mode as shown in FIG. 7A, the plurality of primary sensors 108A-108D are fully functional and active. As shown in FIG. 7A, the FLPS 108B is connected to the FLZC 104B, and the FRPS 108A is connected to the FRZC 104A. The same configuration is mirrored in the rear zone of the SDV 101, where the RLPS 108C is connected to the RLZC 104, and the RRPS 108D is connected to the RRZC 104D. In the normal mode, the plurality of primary sensors 108A-108D collect data and transmit it through their nearest ZCs to the CC 102 configured as the VSM and runs the voter service which processes and manages the overall vehicle operations. The communication paths between the active primary sensors 108A-108D and the active HPCs are indicated by dotted lines, while the communication paths between inactive secondary sensors 110A-110B and tertiary sensors 112A-112D while they remain on standby are indicated by solid lines.

In the event of a fault or failure of the primary sensors 108A-108D, the system 100 enters the fault-operational mode, as illustrated in FIG. 7B. For example, if the FLPS 108B fails, the system 100 may activate the FLSS 110B to maintain functional safety of the SDV 101. As mentioned earlier, these secondary sensors 110A-110D are connected to the next to the nearest ZC within the same zone to introduce redundancy. In this case, the FLSS 110B, which was previously inactive, is now connected to the FRZC 104A and is operationally active. Similarly, the FRSS 110A is connected to the FLZC 104B. Further, in normal mode, the RLSS 110C is connected to the RRZC 104D, and the RRSS 110D is connected to the RLZC 104C. If the FLPS 108B fails, the FLSS 110B may be activated and connects to the FRZC 104A. This ensures that sensor functionality in the front zone is maintained even if a primary sensors 108A-108D fail. The Fault-operational mode is characterized by the activation of the redundant secondary sensors 110A-110D, with the newly active paths highlighted by using dotted lines, while the inactive primary paths (due to sensor failure) are depicted by solid lines. This mode ensures that the SDV 101 remains operational and can safely continue its journey despite sensor failure.

In cases where both the primary sensors 108A-108D and the secondary sensors 110A-110D fail, the SDV 101 transitions into the emergency mode, as illustrated in FIG. 7C. In the emergency mode, the plurality of tertiary sensors 112A-112D located at the front zone and the rear zone of the SDV 101, are activated to take over the sensor framework. These tertiary sensors 112A-112D are directly connected to the EC 106 and bypasses the ZCs 104A-104D. Thus, EC 106 handles data processing and vehicle control independently. For instance, in this scenario, both the FLPS 108B and the FLSS 110B have failed, prompting the activation of the FLTS 112B and the FRTS 112A connected directly to the EC 106. The active paths for the tertiary sensors 112A-112D are indicated by the dotted lines, and the SDV 101 relies on the EC 106 to bring the SDV 101 to a safe stop or transition into a safe state.

Figure 8:
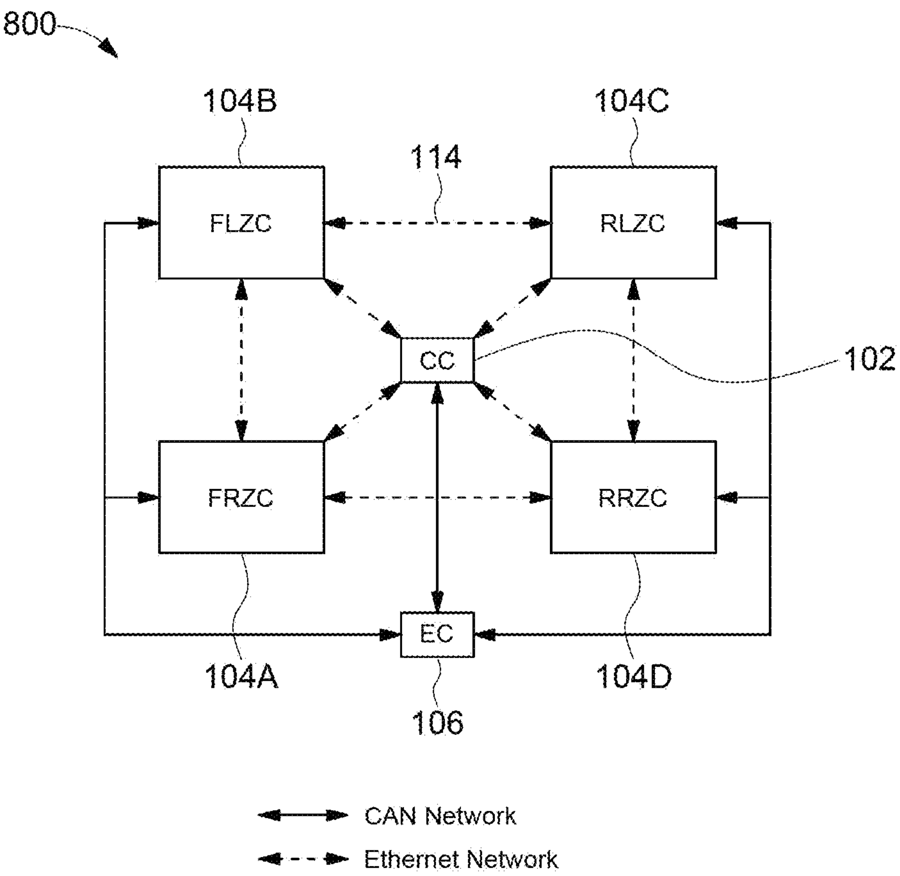
FIG. 8 illustrates a network bus topology of network buses within the software defined vehicle, in accordance with an embodiment of the present disclosure.

Referring now to FIG. 8, a network bus topology 800 of the network buses within the SDV 101, is illustrated, in accordance with an exemplary embodiment of the present disclosure. FIG. 8 shows how the network is designed to prevent a single point failure to ensure safety of the SDV 101 and fault-tolerant communication between the various controllers 102, 104A-104B, 106 and the sensors 108A-108D, 110A-110D, 112A-112D within the SDV 101.

In this configuration, the primary network bus 114 is the Ethernet network bus, represented by dotted lines, which connects the plurality of ZCs 104A-104D such as the FLZC 104B, the RLZC 104C, the FRZC 104A, and the RRZC 104D. The plurality of ZCs 104A-104D are also connected to the CC 102 through the primary network bus 114. However, to avoid any single point failure in the Ethernet network bus, the secondary network bus 116 which is a redundant CAN network bus, shown by the solid lines, provides an alternative path. The CAN network bus connects the plurality of ZCs 104A-104D and the EC 106, which becomes crucial in case of a failure in the Ethernet network. This redundancy allows the system 100 to seamlessly switch to the CAN network bus as an alternate communication path if the Ethernet network bus fails, preventing communication breakdowns between the plurality of ZCs 104A-104D and the EC 106.

When the SDV 101 encounters an Ethernet network bus failure, the VSM triggers a transition of the SDV 101 to the emergency mode. In this mode the VSM may notify the EC 106 over the CAN network bus. The EC 106 is responsible for executing the SSP micro-service, which ensures the SDV 101 reaches a safe state by managing the critical operations of the plurality of the ZCs 104A-104D via the CAN network bus. Additionally, the VSM continuously monitors the health of both the EC 106 and the CAN network bus (i.e., the secondary network bus 116). If a fault is detected in either the EC 106 or the CAN network bus, the VSM may immediately trigger a transition of the SDV 101 to enter the emergency mode. In this scenario, the VSM, along with remaining the plurality of ZCs 104A-104D may coordinate the execution of the SSP micro-service for the SDV 101.

Referring back to FIG. 1, the SDV 101 may also include a power management subsystem which is designed to ensure operational continuity in the event of a failure in the primary power source. The SDV 101 incorporates the secondary power source, which serves as an alternate power supply to avoid a single point of failure. This redundancy allows maintaining basic vehicle operations even when the primary power source fails, thereby ensuring that the SDV 101 can still function in the degraded mode.

At the center of this power management subsystem is the switch, which plays a critical role in monitoring the health of the primary power source. The switch is constantly evaluating the status of the primary power supply, scanning for faults or irregularities. In the event that a fault is detected, the switch immediately alerts the VSM. Upon receiving the fault notification, the VSM transitions the SDV 101 from the normal mode to the degraded mode. The degraded mode is designed to minimize vehicle functionalities by only allowing the SDV 101 to continue operating safely but reduced capabilities. This ensures that critical systems can still function while non-essential systems may be scaled back or turned off to conserve power.

Simultaneously, the switch also activates the secondary power source to ensure the SDV 101 continues to receive adequate power for essential operations. The seamless transition between the primary power source and the secondary power source, managed by the switch and overseen by the VSM, allows the SDV 101 to mitigate the risks associated with a primary power failure. By relying on this backup power supply, the SDV 101 may still maintain sufficient functionality to navigate safely, possibly moving to a safe location or performing other vital actions until the primary power issue is resolved.

Additionally, providing functional safety at the HPC level is a crucial aspect of maintaining the vehicle's operational integrity. At this level, faults can occur in any hardware or software component of the plurality of HPCs, which include the plurality of ZCs 104A-104D and the CC 102. These faults may include various elements such as data functions, the micro-services, the containers, the fault managers (i.e., the fault manager master and the fault manager slave), and the nodes of each of the plurality of HPCs, and the voter service on the CC 102. One of the key types of faults monitored at the HPC level is in the vehicle feature data function, which involves data acquisition, data perception, and decision-making micro-services. These services are fundamental to the autonomous operation of the SDV 101, relying heavily on sensor data for accurate decision-making.

The data acquisition service is responsible for gathering data from the plurality of primary sensors 108A-108D of the SDV 101. To ensure data reliability, the data acquisition service conducts a plausibility test on the sensor data acquired from the plurality of primary sensors 108A-108D to detect any potential faults. If the acquired sensor data from a primary sensor fails this plausibility test, the plausibility test indicates a fault in the primary sensor. Upon detecting a fault in the primary sensor, the data acquisition service promptly notifies the fault manager (master) of the associated ZC through an associated fault manager (container). The fault manager (master) then escalates the issue to the VSM, which in turn activates a secondary sensor of the same zone to take over. This transition allows the vehicle to continue operating with reduced functionality, while the primary sensor fault is addressed.

If no faults are found in the sensor data, the SDV 101 remains in the normal mode. The perception service processes the acquired sensor data, and the decision-making service processes the acquired data, and the decision-making service uses the output from the perception service to determine the next course of action for the vehicle. In the SDV 101, the perception service and the decision-making service are designed to operate redundantly across three different HPCs to ensure fault tolerance. The voter service runs on the CC 102, is responsible for collecting and comparing the outputs of the three HPCs. The voter service plays a critical role in identifying inconsistencies that may indicate faults in the system 100.

If the voter service detects that none of the outputs from the three HPCs match, which indicates a critical fault, the voter service immediately notifies the VSM to transition the SDV 101 to the emergency mode. This safeguard ensures that the SDV 101 responds appropriately to potential system-wide failures to maintain safety as the highest priority. If the voter service detects that only one of the three outputs from the three HPCs does not match with remaining two of the three HPCs, the voter service identifies this as a less critical fault. In this case, the voter service notifies the VSM to transition the SDV 101 to the degraded mode, which restricts certain functionalities but allows the SDV 101 to continue operating safely while the fault is further investigated. In both cases of mismatch, whether full or partial, the system 100 escalates the SDV 101 to a higher safety mode (either degraded or emergency), prioritizing safety over continued functionality.

The system 100 also addresses faults occurring within the micro-services of the plurality of HPCs. Each micro-service operates within a container, and fault detection is an integral part of maintaining the reliability and health of the system 100. Micro-services are essential for carrying out the various functions required by the plurality of HPCs of the SDV 101, and a fault in any micro-service may potentially impact the entire system 100. To manage fault in any of the micro-services, the system 100 includes a fault manager (container) within each container. The fault manager (container) is housed within each container, whose primary role is to monitor the health of the micro-service running inside the associated container.

Each container houses one or more micro-services, and the fault manager (container) associated with the container constantly checks the health status of the one or more micro-services. The fault manager (container) continuously monitors for potential faults in real-time, thereby ensuring that any deviation from normal operation is detected early. If the micro-service begins to malfunction or deviates from its expected execution parameters, the fault manager (master) may identify and report the issue.

To ensure a consistent and structured method of monitoring, each micro-service establishes a safety contract with the fault manager (container) within the container. The safety contract outlines specific parameters and metrics for fault detection, allowing the fault manager (container) to evaluate the micro-service's performance against predefined benchmarks. The safety contract typically includes a periodicity of execution, which is the expected intervals at which the micro-service should run. The safety contract further includes an execution duration, which is the length of time of the micro-service is expected to take to complete its tasks. The safety contract further includes a functional checkpoints, which are the key milestones within the execution of the micro-service, where its operation is checked for faults or irregularities. The safety contract further includes a step-sequence, which is the precise sequence in which tasks should be carried out by the micro-service. Any deviation from this sequency may indicate a fault.

By enforcing the safety contract, the system 100 ensures that the micro-services operate within controlled boundaries, and any abnormalities in execution are flagged as potential faults. In addition to the fault manager (container), the micro-services within the containers are further monitored by the fault manager (slave), which operated at the HPC level. The fault manager (slave) provides an additional layer of fault detection and monitoring, ensuring that any potential issues within the container are escalated to the fault manager (master) at HPC fault management level. This hierarchical approach enables the system 100 to detect and respond to faults at both the micro-service and container levels. When a fault is detected, the fault manager (slave) is responsible for notifying the VSM and activates the appropriate response. This may include transitioning the SDV 101 to the degraded mode or the emergency mode, depicting on the severity of the detected fault and its impact on the system 100.

The system 100 also includes mechanisms for fault detection at the HPC platform level to ensure monitoring of critical components such as the fault manager (slave), hypervisor, within the plurality of HPCs and the voter service within the CC 102. This layer of fault detection safeguards the SDV 101 by continuously assessing the performance of the plurality of HPCs and reporting any identified issues to the VSM. Fault detection within the plurality of HPCs involves monitoring the core components and services that support the operation of the plurality of HPCs, such as the fault manager (slave), the fault manager (master), the hypervisor, the voter service and other critical nodes running on the performance island of the HPC.

The fault manager (master) resides on the safety island of each HPC from the plurality of HPCs and plays a critical role in overseeing the health of the HPC. The fault manager (master) continuously monitors the status of various services running on the HPC, thereby ensuring that the system 100 is functioning as expected. The fault manager (master) is tasked with supervising not only the micro-services but also other critical elements like the hypervisor and the voter service.

The fault manager (slave) resides on the performance island of each HPC, periodically sends a heartbeat signals to the fault manager (master) of the HPC. The heartbeat signal contains detailed information about the operational status of key components of the HPC, including, the hypervisor, the voter service, and the safety-critical service nodes. In an embodiment, the hypervisor within the HPC is a virtualization layer responsible for managing and allocating resources to various virtual machines running within the HPC. In an embodiment, the voter service typically running on the CC 102 responsible for comparing outputs from redundant processes running on remaining HPCs and identifying any mismatches or discrepancies. In an embodiment, the safety-critical service nodes include micro-services related to Advanced Driver Assistance Systems (ADAS) and Autonomous Driving (AD), running in containers within the HPC. The fault manager (slave) monitors their execution and reports any irregularities.

This regular exchange of health status information allows the fault manager (master) to maintain a real-time overview of each of the plurality of HPCs and detect any emerging issues. At the start-up of the each of the plurality of HPCs, and periodically during operation of each of the plurality of HPCs, the fault manager (slave) within the HPC may perform, but is not limited to, a series of built-in-self-tests (BISTs) to evaluate the integrity of the performance island of the HPC. These BISTs check for potential faults in the critical components of the HPC, such as the hypervisor and the voter service to ensure that they are operating correctly. If any issues are detected, the fault manager (slave) immediately notifies the fault manager (master).

When a fault is detected within the HPC, the fault manager (master) promptly alerts the VSM about the issue. This notification includes details of the fault, whether the fault pertains to the hypervisor, the voter service, or other critical component. Additionally, if the fault manager (master) identifies a critical fault that threatens the overall functionality of the HPC, the fault manager (master) immediately stops transmitting heartbeat signals. This cessation of the heartbeat signals is an indicator for the VSM, which interprets the heartbeat signals as a failure of the entire HPC. In the event of such a failure of the entire HPC, the VSM may take immediate action, moving the SDV 101 to a higher safety mode, such as the degraded mode and the emergency mode, depending on the severity of the fault and the availability of redundant system.

The system 100 also incorporates detection and management of faults within the ASIL D-critical services running on the safety island of the HPC. These critical services such as the VSM and the SVSM, as well the fault manager (master) is integral to provide the safety and fault-tolerance of the SDV 101. Fault detection in ASIL D-critical services is a key aspect of maintaining safety of the SDV 101, as the ASIL D-critical services manage high-integrity safety functions. The fault manager (master) on the safety island plays a critical role in overseeing the health of these critical service and ensuring they operate without interruption.

At the initial boot-up of the HPC, the fault manager (master) may perform, but is not limited to, a series of BISTs to verify the operational readiness of the safety island. These tests are conducted to assess whether the ASIL D-critical services, such as the VSM and the SVSM are correctly initialized and ready to manage the safety functions of the SDV 101. The fault manager (master) checks for potential errors during the start-up phase and immediately flags any issues that could affect the execution of critical services. Once the HPC is running, the fault manager (master) continually monitors the status of ASIL D-critical services through runtime tests. These tests include a program flow monitoring and a temporal flow monitoring. The program flow monitoring ensures that the critical services follow their expected execution sequence and detect any deviations or interruptions in their process flow. The temporal flow monitoring checks that the critical services are executed within defined time constraints to ensure timely responses critical for maintaining safety of the SDV 101.

By performing the BISTs, the fault manager (master) may detect any faults that arise during the normal operation of the ASIL D-critical services, thereby ensuring continued reliability of the VSM, the SVSM, and other critical components running on the safety island. In case a fault is detected during either the start-up BISTs or runtime monitoring, the fault manager (master) notifies the VSM immediately. Additionally, if the fault manager (slave) on the performance island detects a fault within its domain, the fault manager (slave) sends a heartbeat signal to the fault manager (master), which may then assess the overall health of the HPC. If a fault is identified in any of the ASIL D-critical services or components monitored by the fault manager (master), the VSM is alerted, allowing the VSM to take appropriate action, such as switching the SDV 101 to the degraded mode or the emergency mode.

If the fault manager (master) detects a critical issue that affects the overall functioning of the HPC or the ASIL D-critical services within the HPC, the fault manager (master) immediately stops transmitting the heartbeat signals to the VSM. The VSM interprets the cessation of the heartbeat signals as a failure of the HPC. This ensures that any critical fault in the safety island or its critical services is quickly detected and acted upon to prevent further system failures and maintaining the functional safety of the SDV 101.

Figure 9:
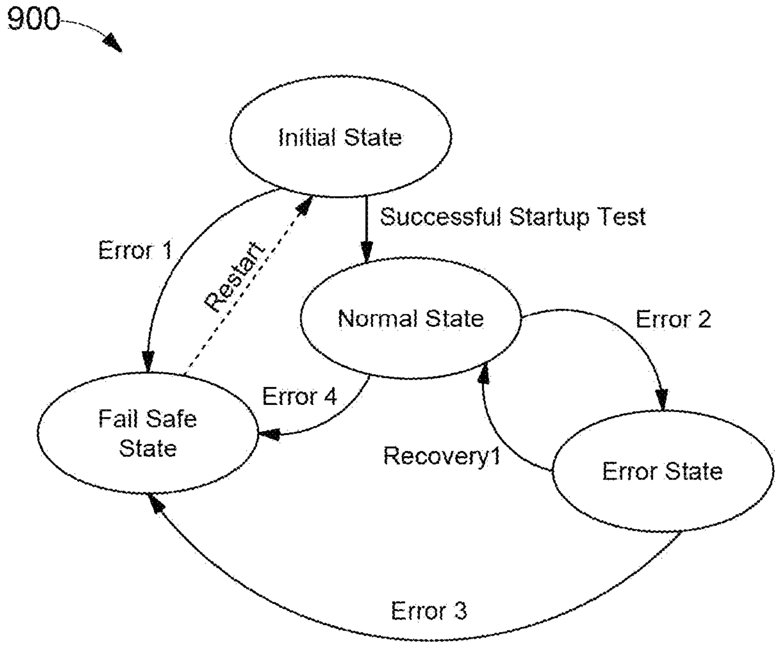
FIG. 9 illustrates a state diagram depicting transition of safety states of the HPC, in accordance with an exemplary embodiment of the present disclosure.

Referring now to FIG. 9, a state diagram 900 depicting transition of safety states of the HPC, in accordance with an exemplary embodiment of the present disclosure. The safety state transition for the HPC is managed by the fault manager (master), who oversees the overall safety state machine of the HPC. The state diagram 900 represents various safety states, the HPC transitions through based on operational status and fault conditions of the HPC. The HPC undergoes four main states that may include an initial state, a normal state, an error state, and a fail-safe state, with corresponding transitions triggered by various error conditions and recovery mechanisms.

The initial state is the first state entered after the start-up of the HPC. During this state, both the fault manager (master) and the fault manager (slave) may perform, but is not limited to, a series of built-in-self-tests (BISTs) to check the health of the safety and performance islands, respectively. The BISTs may include, but are not limited to, checks for RAM, ROM, Core functionality, and clock synchronization. Upon successful completion of the BISTs, the HPC transitions to the normal state.

Once the HPC successfully passes the series of BISTs, the HPC transitions to the normal state, where functionalities of each of the plurality of HPCs are active and operating normally. The fault manager (master) of the HPC continues to monitor for faults while performing its regular operations. If a recoverable fault is detected, the fault manager (master) may transition the HPC to the error state to attempt recovery.

The error state is entered when a recoverable error is detected in the normal state. Errors in the error state may relate to failures in micro-services, containers, or nodes within the HPC. In the error state, the fault manager (slave) attempts to recover the faulty components by re-launching the affected container or micro-service. The VSM is not immediately notified in the error state, as the HPC tries to recover on its own. If recovery is successful (through Recovery 1), the fault manager (master) transitions the HPC back to the normal state. If recovery fails, the fault manager (master) may escalate the HPC to the fail-safe state.

If the HPC detects non-recoverable faults, such as the failure of a BIST, non-recoverable errors in micro-services, containers, or fault managers, or failures in critical components like the hypervisor or the voter service, the HPC enters the fail-safe state. In the fail-safe state, the HPC attempts to restart and move back to the initial state. If the fault manager (master) is still functional, the fault manager (master) may notify the VSM of the failure. If the fault manager (master) stops transmitting heartbeat signals to the VSM, it may be considered as a critical HPC failure.

FIG. 9 outlines several key transitions between the four states. In case of Error 1, if the HPC fails a BIST during the initial state, or if there is a failure in either the fault manager (master) or the fault manager (slave) or key performance/safety components, the HPC transitions directly to the fail-safe state. In case of Error 2, if a recoverable error (such as micro-service or container failure) occurs in the normal state, the HPC transitions to the error state to attempt recovery. In case of error 3, if the HPC cannot recover from error in the error state, despite the fault manager (master) attempting to re-launch the faulty component, the HPC escalates to the fail-safe state. In case of Error 4, if a critical fault occurs in the normal state, such as the failure of a fault manager or essential component like the VSM, the HPC moves directly to the fail-safe state.

Recovery 1 occurs when the fault manager (slave) successfully re-launches a faulty container, micro-service, or node within a predefined number of attempts, thereby allowing the HPC to return to the normal state. In case of Restart, if there are non-recoverable faults, the fault manager (master) restarts the HPC for returning to the initial state to attempt recovery from detected faults. In cases where multiple faults are detected, the HPC may prioritize transitioning to a higher safety state (i.e., moving from normal to error, or from error to fail-safe) to ensure safety of the SDV 101.

Referring back to FIG. 1, the system 100 also includes fault tolerance mechanisms at the HPC level to ensure that the SDV 101 can continue to operate even when faults are detected in the plurality of HPCs. The system design addresses fault tolerance in key data functions such as the perception service and the decision-making service, which are critical for the operations of the SDV 101.

The fault tolerance mechanisms incorporate redundancy in the processing of data functions to prevent single point failure that may compromise the ability of the SDV 101 to operate safely. Specifically, the perception service and the decision-making service are not confined to a single HPC. Instead, the perception service and the decision-making service are distributed across three different HPCs. This ensures that if one HPC fails, the same data functions may still be processed by the remaining operational HPCs, thus maintaining functionality of the SDV 101.

In the event that one of the HPCs encounters a fault or fails, the VSM may dynamically shift the workload of the one of the HPCs to one of remaining HPCs which is closest to the one of the HPCs. This allows the SDV 101 to continue running without a complete shutdown of critical services. Depending on the extent of the fault and the number of HPCs affected, the VSM may adjust the operational modes of the SDV 101 to ensure safety.

The voter service monitors the output of the three HPCs. If discrepancies or faults are detected in the data outputs from one or more HPCs, the voter service notifies the VSM of the faults and the VSM moves the SDV 101 to the degraded mode or, in severe cases, to the emergency mode, depending on how many HPCs are compromised. The fault tolerance mechanism ensures that the SDV 101 does not rely on faulty or inconsistent data, thereby minimizing the risk of unsafe driving decisions.

While the VSM transitions the SDV 101 to a safe operational mode, parallel recovery solutions are also implemented. The fault manager (master) of a faulty HPC attempts to recover the faulty HPCs by identifying and addressing the fault detected within the faulty HPC. This could involve re-launching failed micro-services, containers, or even restarting the faulty HPC to resolve critical issues. Once the HPC is successfully recovered, the HPC may rejoin the data function execution to support the remaining HPCs.

Figure 10:
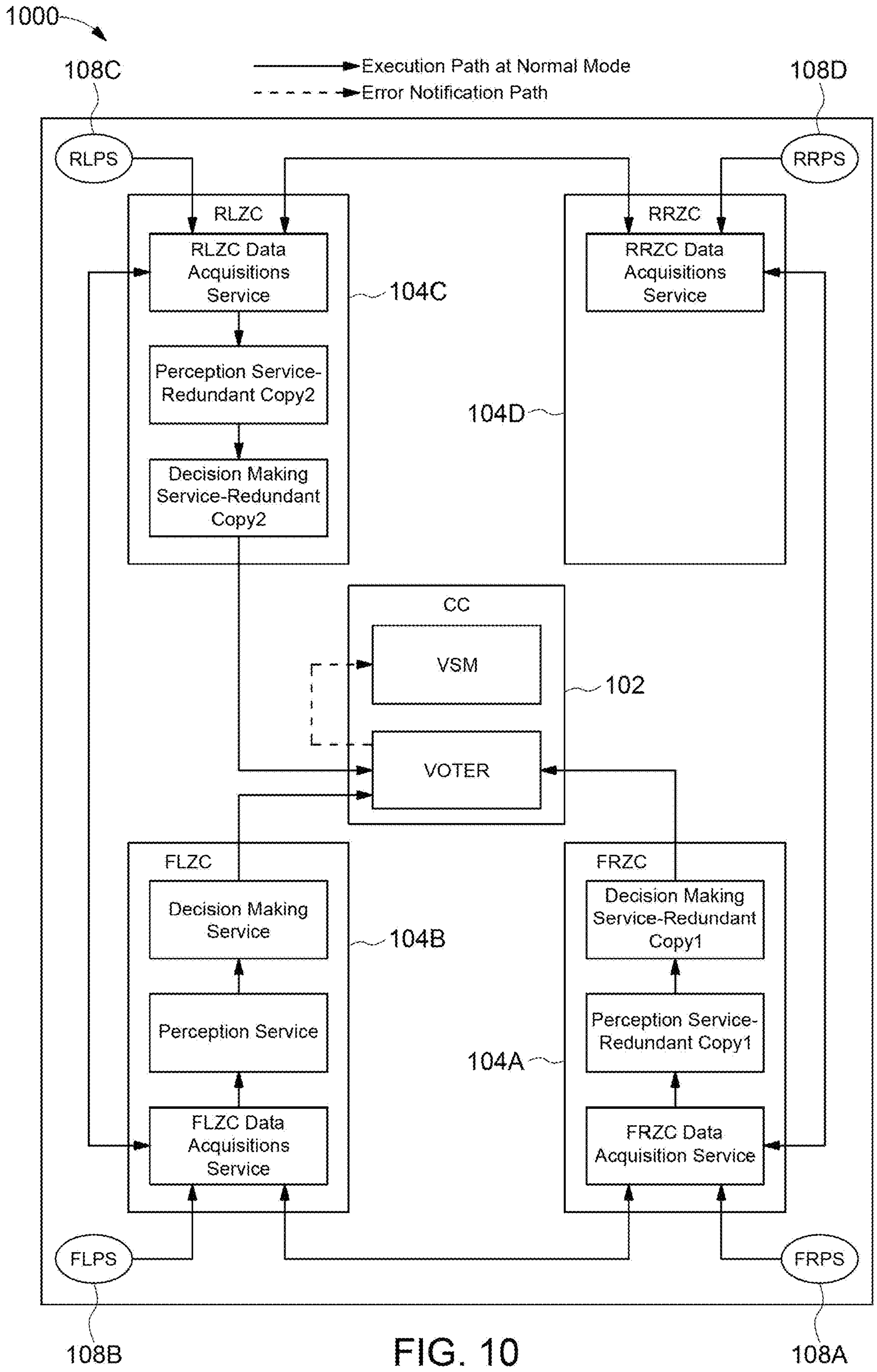
FIG. 10 illustrates a flow diagram depicting execution flow in normal mode for the software defined vehicle, in accordance with an exemplary embodiment of the present disclosure.

Referring now to FIG. 10, a flow diagram 1000 depicting execution flow in normal mode for the SDV 101, is illustrated, in accordance with an embodiment of the present disclosure. FIG. 10 specifically showing how the voter service operates in the CC 102 to maintain vehicle functionality by processing outputs from three of the plurality of HPCs of three of the ZCs 104A-104D.

The RLZC 104C and the FRZC 104A are responsible for processing redundant copies of the perception service and the decision-making service, ensuring that critical data from the vehicle sensors is consistently available and processed even in the event of a fault. The plurality of ZCs 104A-104D also manages the data acquisition service, which collects sensor information from the plurality of primary sensors within each zone of the SDV 101. The RRZC 104D and the FLZC 104B also perform similar data acquisition service but handle other sections of the sensor network within the SDV 101.

The RLZC 104C and the FRZC 104A execute redundant copies of the perception service and the decision making service, indicated as "Redundant Copy 1" and "Redundant Copy 2". These copies ensure that each function is independently verified across different ZCs to prevent errors in data processing. The data acquisition service of each of the plurality of ZCs 104A-104B receives data from a respective primary sensor 108A-108D. For example, the FRZC 104A receives data from the FRPS 108A, the FLZC 104B receives data from the FLPS 108B, the RLZC 104C receives data from the RLPS 108C, and the RRZC 104D receives data from the RRPS 108D. The perception service takes data from the respective data acquisition service of the ZC and processes the data and passes the processed data on to the decision making service, which determines the appropriate course of action to be taken by the SDV 101.

The CC 102 houses the voter service and the VSM. The voter service plays a critical role in ensuring the integrity of the decision-making services housed within the three of the plurality of ZCs by comparing outputs of the decision-making service of the three of the plurality of ZCs. The voter service checks the outputs from the three of the plurality of ZCs and ensures that the outputs are consistent. If the outputs from the three of the plurality of ZCs match, the SDV 101 remains in the normal mode.

In normal mode, the voter service receives outputs from the three of the plurality of ZCs (i.e., the FRZC 104A, the FLZC 104B, and the RLZC 104C). When the outputs from the three of the plurality of ZCs are matching, the voter service verifies that the SDV 101 is operating in the normal mode, with no faults detected in any of the plurality of ZCs. In addition to processing the outputs from the three of the plurality of ZCs, the voter service continuously monitors for any errors or discrepancies in the outputs from the three of the plurality of ZCs based on a mismatch of an output of one ZC from the three of the plurality of ZCs with other two outputs of remaining two ZCs from the three of the plurality of ZCs. If the voter service detects the mismatch of the output with the other two outputs, the voter service informs the VSM, which in turn triggers a transition of the SDV to the degraded mode or other safety mode, depending on the severity of the error.

Figure 11:
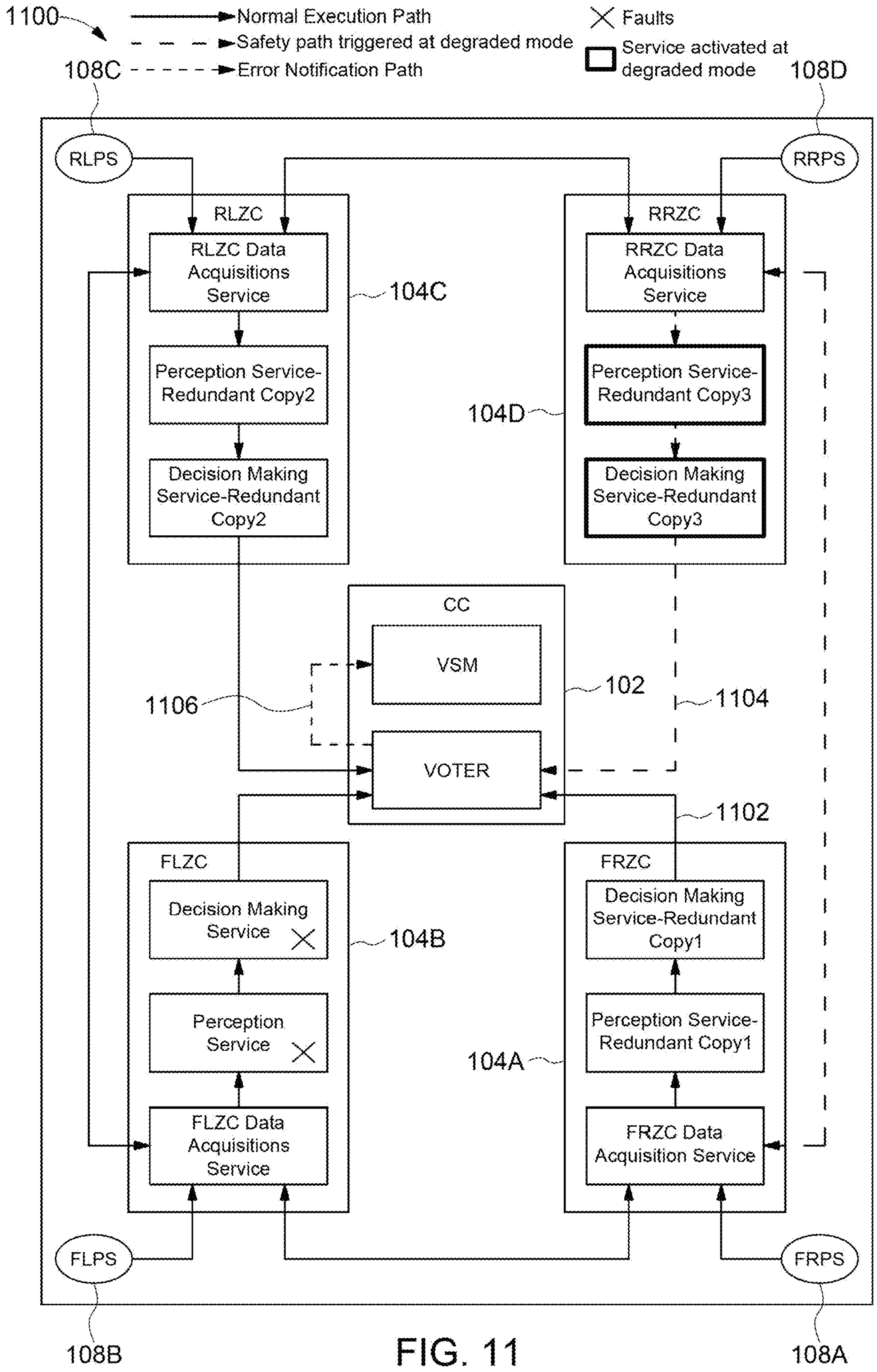
FIG. 11 illustrates a flow diagram depicting execution flow in degraded mode for the software defined vehicle, in accordance with an exemplary embodiment of the present disclosure.

Referring now to FIG. 11, a flow diagram 1100 depicting execution flow in degraded mode for the SDV 101, is illustrated, in accordance with an embodiment of the present disclosure. The SDV 101 transitions into the degraded mode due to a detected fault in one of the plurality of HPCs. In this case, the fault is identified within the FLZC 104B. The FLZC 104B has encountered a failure, as indicated by the crosses over both the perception service and the decision making service. The outputs of the FLZC 104B are no longer reliable, prompting the system 100 to exclude the FLZC 104B from the operational flow. The remaining ZCs from the plurality of ZCs, namely the RLZC 104C and the RRZC 104D, continue to function normally, each monitoring the data acquisition service, the perception service, and the decision making service. The controllers ensure that the SDV 101 can still operate, leveraging their redundant capabilities.

At the core of the CC 102 is the voter service, which compares the output from the perception services and the decision making service executed by the three of the plurality of ZCs. The voter service has detected a mismatch in the output from the FLZC 104B, which causes the FLZC 104B to notify the VSM about the fault. In response, the VSM triggers a failover mechanism, launching redundant copies of the perception service and the decision making service on the RRZC 104D, as part of the system's fault-tolerant design. The FLZC 104B was responsible for executing a redundant copy of both the perception service and the decision making service. However, due to the failure, the services are deactivated, and their redundant functions are shifted to the RRZC 104D, which now handles both its own tasks and the previously assigned tasks of the FLZC 104B. The RLZC 104C continues to function without fault, providing data from the perception service and the decision making service.

The RLZC 104C continues to operate along the normal execution path, transmitting its valid outputs to the voter service within the CC 102. These operations are depicted by first arrows 1102, which represent the flow of valid data during normal operation. Once the voter service detects the mismatch in output from the FLZC 104B, the voter service sends an error notification to the VSM to initiate corrective actions. In response to the fault, the VSM triggers the launch of the redundant perception service and the decision making service on the RRZC 104D. This shift in execution is represented by second arrows 1104, which show the rerouted flow of data processing to ensure continued vehicle operation in the degraded mode.

The plurality of primary sensors, represented by the FRPS 108A, the FLPS 108B, the RLPS 108C, and the RRPS 108D, continue to feed data into the respective ZCs, enabling them to perform their data acquisition services. Despite the failure of the FLZC 104B, the other ZCs remain fully operational and continue to process sensor data to maintain vehicle control. In degraded mode, the system 100 ensures that fault management is handled dynamically. The voter service continuously monitors the outputs from the ZC and immediately flag any discrepancies. By notifying the VSM, the VSM can reallocate computing tasks from the faulty FLZC 104B to the remaining functional ZCs, specifically the RRZC 104D in this case.

Figure 12:
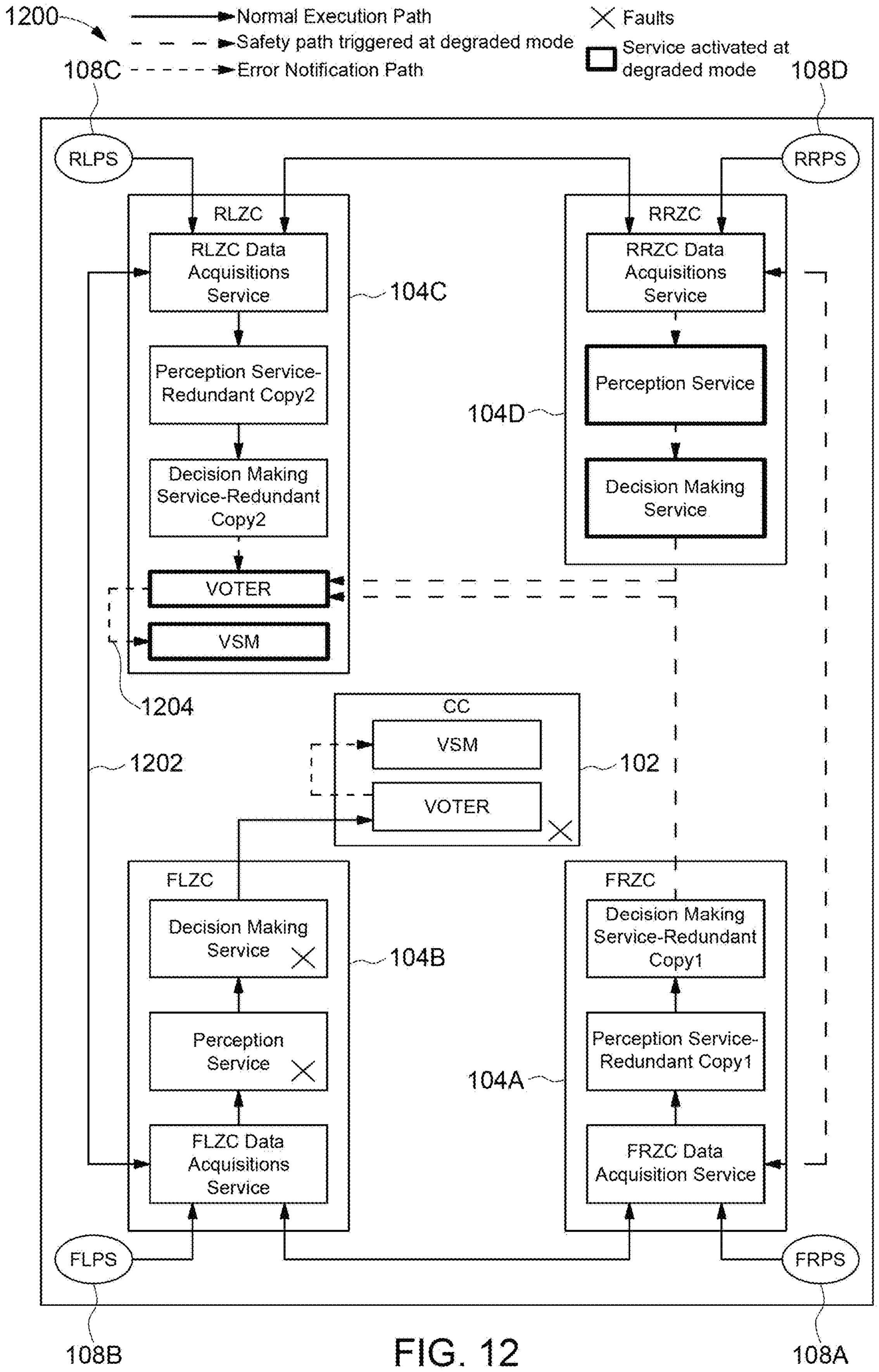
FIG. 12 illustrates another flow diagram depicting execution flow in the degraded mode for the software defined vehicle, in accordance with an exemplary embodiment of the present disclosure.

Referring now to FIG. 12, another flow diagram 1200 depicting execution flow in the degraded mode for the SDV 101, is illustrated, in accordance with an embodiment of the present disclosure. FIG. 12 depicts a scenario where the SDV 101 remains in the degraded mode after experiencing a simultaneous fault in both the CC 102 and one of the ZCs, specifically the FLZC 104B. FIG. 12 highlights the fault-tolerant behavior of the system 100 by showcasing how the SDV 101 continues to operate even when the CC 102 becomes faulty, with the critical services transferred to one of remaining ZCs from the plurality of ZCs 104A-104D, determined by the dynamic priority assignment technique.

The FLZC 104B, which is one of the ZCs, is identified as faulty, as indicated by the crosses over its perception service and the decision making service. This results in the exclusion of the FLZC 104B from the operational flow. The RLZC 104C and the RRZC 104D continue to operate normally, each performing their respective data acquisition services, the perception services, and the decision making services. The plurality of ZCs is essential for maintaining vehicle control during degraded mode operations.

In this scenario, the CC 102 has become faulty, as shown by the cross over the voter service and the VSM within the CC 102. The system 100 identifies the fault in the CC 102 when the RLZC 104C, acting as the SVSM, does not receive a heartbeat signal from the CC 102, indicating a failure. As a result, the voter service and the VSM service, which are typically executed on the CC 102, are dynamically reassigned to the RLZC 104C based on the dynamic priority assignment technique. This ensures that the ASIL D-critical services continue to function despite the failure of the CC 102.

The RLZC 104C now takes over the role of executing the voter service and the VSM service, in addition to its original tasks of managing the perception service and the decision-making service (redundant copy 2). The RRZC 104D is still responsible for running both the perception service and the decision making service (redundant copy 3), as well as hosting the services previously executed by the faulty FLZC 104B.

In the normal execution path, the RLZC 104C and the RRZC 104D continue to function along the normal execution path, as represented by first arrows 1202, providing valid perception output and decision-making output to a newly assigned voter service within the RLZC 104C. Upon detecting the fault in the CC 102, the system 100 initiates the error notification path, as shown by second arrows 1204. The SVSM in the RLZC 104C identifies the failure of the CC 102 and automatically transitions the voter service and the VSM to the RLZC 104C. In degraded mode execution path, third arrows 1206 represent the rerouted data flow in the degraded mode, where the RLZC 104C takes over as the primary execution node for the voter service and the VSM, as well as maintaining its perception service and the decision-making services. The RRZC 104D continues to operate its services in parallel.

The plurality of primary sensors, represented by the FRPS 108A, the FLPS 108B, the RLPS 108C, and the RRPS 108D, continue to provide sensor data to their respective ZCs. The RLZC 104C and the RRZC 104D both handle their data acquisition functions effectively, thereby ensuring that the SDV 101 maintains situational awareness despite the faults.

Referring back to FIG. 1, the system 100 may also include faut tolerance mechanism implemented at the HPC-level focusing on ensuring continued operation of an HPC in case of a failure in a micro-service within a container of the HPC. The fault manager (slave), housed at each HPC (i.e., the FRZC 104A, the FLZC 104B, the RLZC 104C, the RRZC 104D, and the CC 102), continuously monitors the performance of micro-services running within its assigned HPC container. These micro-services may include key functions such as perception services, decision-making services, and data acquisition services, which are critical for control and operation of the SDV 101.

In the event of a failure of these micro-services, the fault manager (slave) within a faulty HPC attempts to recover by re-launching a corresponding container via the container orchestrator. This recovery process is automatically initiated and repeated for a predefined number of attempts, during which the fault manager (slave) aims to restore the failed micro-service to its operational state. The container orchestrator is responsible for managing the deployment, scaling, and operation of the micro-services to ensure theses micro-services are re-launched correctly after a failure. If the fault manager (slave) exhausts its predefined attempts to recover the micro-service and the failure still persists, the fault manager (slave) escalates the issue by notifying the fault manager (master). The fault manager (master) promptly informs the VSM located at the CC 102, about the detected fault.

Upon receiving the fault notification, the VSM activates the fault tolerance mechanism by instructing one of the remaining HPCs from the plurality of HPCs as per the dynamic priority assignment technique to take over the tasks that were being processed by the faulty HPC. For example, if the micro-service failure occurs at the FLZC 104B, the VSM would dynamically assign the redundant processing tasks to the RRZC 104D, which may take over the perception service and the decision-making service that were previously handled by the FLZC 104B.

The system 100 further implements fault tolerance at the HPC platform level to handle faults that may occur in the core components of the plurality of HPCs. Each HPC (i.e., the FRZC 104A, the FLZC 104B, the RLZC 104C, the RRZC 104D, and the CC 102) runs essential platform services, including operating systems, middleware, and other infrastructure that enable the execution of micro-services like the perception service, the decision making service, and the data acquisition service. Failures of the HPC platform may result in a complete system outage if not addressed, which is why the system 100 is designed with recover mechanisms managed by the fault manager (master) located within each of the plurality of HPCs.

When a fault occurs within the HPC platform or any of its critical components, the fault manager (master) of the HPC attempts to recover the faulty HPC by restarting the faulty HPC. This restart brings the faulty HPC back to its initial state. The fault manager (master) monitors the HPC during this restart process to determine whether the fault has been resolved. If the restart successfully restores the HPC, the HPC resumes normal operations without further interruption. However, if the fault persists even after the restart, the fault manager (master) escalates the issue by notifying the VSM. The VSM is responsible for ensuring that the SDV 101 continues to operate safely even in the presence of faults. Upon receiving the notification from the fault manager (master), the VSM activates a fault tolerance mechanism by dynamically reassigning the processing tasks of the faulty HPC to one of the remaining HPCs from the plurality of HPCs, selected based on the dynamic priority assignment technique. This reassignment ensures that the SDV 101 remains operational despite the fault. For example, if a fault occurs in the FLZC 104B, the RLZC 104C or another active HPC would take over the tasks of the failed FLZC 104B, such as redundant processing of the perception service and the decision-making service.

Additionally, when the fault manager (master) detects an unrecoverable fault, the fault manager (master) stops sending the heartbeat signal to the VSM. The heartbeat signal is a regular signal sent by the fault manager (master) to the VSM to confirm that the HPC is functioning correctly. The absence of this heartbeat signal prompts the VSM to take corrective action.

The system 100 also implements fault tolerance mechanisms which are extended to cover ASIL D-critical services running on the plurality of HPCs. ASIL D (Autonomous Safety Integrity Level) refers to the highest safety requirement for automotive applications, particularly those with the potential to lead to hazardous conditions in the event of a failure. In this system 100, critical services, such as the vehicle safety monitor (VSM) service, the SVSM service, the fault management service, are classified under ASIL D critical services to ensure the highest level of functional safety. To prevent any single point failure within the ASIL D critical services, the system 100 uses a fault tolerance mechanism. When an ASIL D-critical service experiences a fault in any HPC, the fault manager (master) attempts to recover from the fault by restarting the faulty HPC. This restart process aims to reinitialize the faulty HPC in its default state, thereby restoring the critical services required for safe vehicle operation.

However, if the HPC remains faulty even after the restart, the VSM performs a critical role in detecting the failure. The VSM continuously monitors the health of each HPC by receiving periodic heartbeat signals from the fault manager (master) of each HPC by receiving periodic heartbeat signals from the fault manager (master), which signals that the HPC is functioning correctly. When the VSM fails to receive the heartbeat signals from a specific HPC, the VSM recognized the absence of the heartbeat signal as an indication of a critical fault within that specific HPC. In response, the VSM initiates the dynamic priority assignment technique, whereby one of the remaining HPCs is selected to take over the processing of the tasks originally handled by the faulty HPC. For example, if the FRZC 104A encounters a fault and fails to recover, the RRZC 104D or another active HPC may assume the redundant processing of the VSM service, the SVSM service, or any other ASIL D-critical service.

In an embodiment, the disclosed system 100 may be implemented as a non-transitory computer-readable medium (CRM) that stores executable instructions for providing functional safety of controllers in the SDV 101. The CRM may store non-transitory computer-readable instructions that, when executed by a plurality of controllers, cause the system 100 to perform various operations described in the present disclosure. The CRM may be any form of non-volatile memory, such as a flash memory, a random access memory (RAM), a read-only memory (ROM), or an electrically erasable programmable read-only memory (EEPROM), volatile memory, nonvolatile memory, hard drives, CD ROMs, DVDs, flash drives, disks, and any other known physical storage media configured to store data and executable instructions for providing functional safety of controllers in the SDV 101.

Figure 13A:
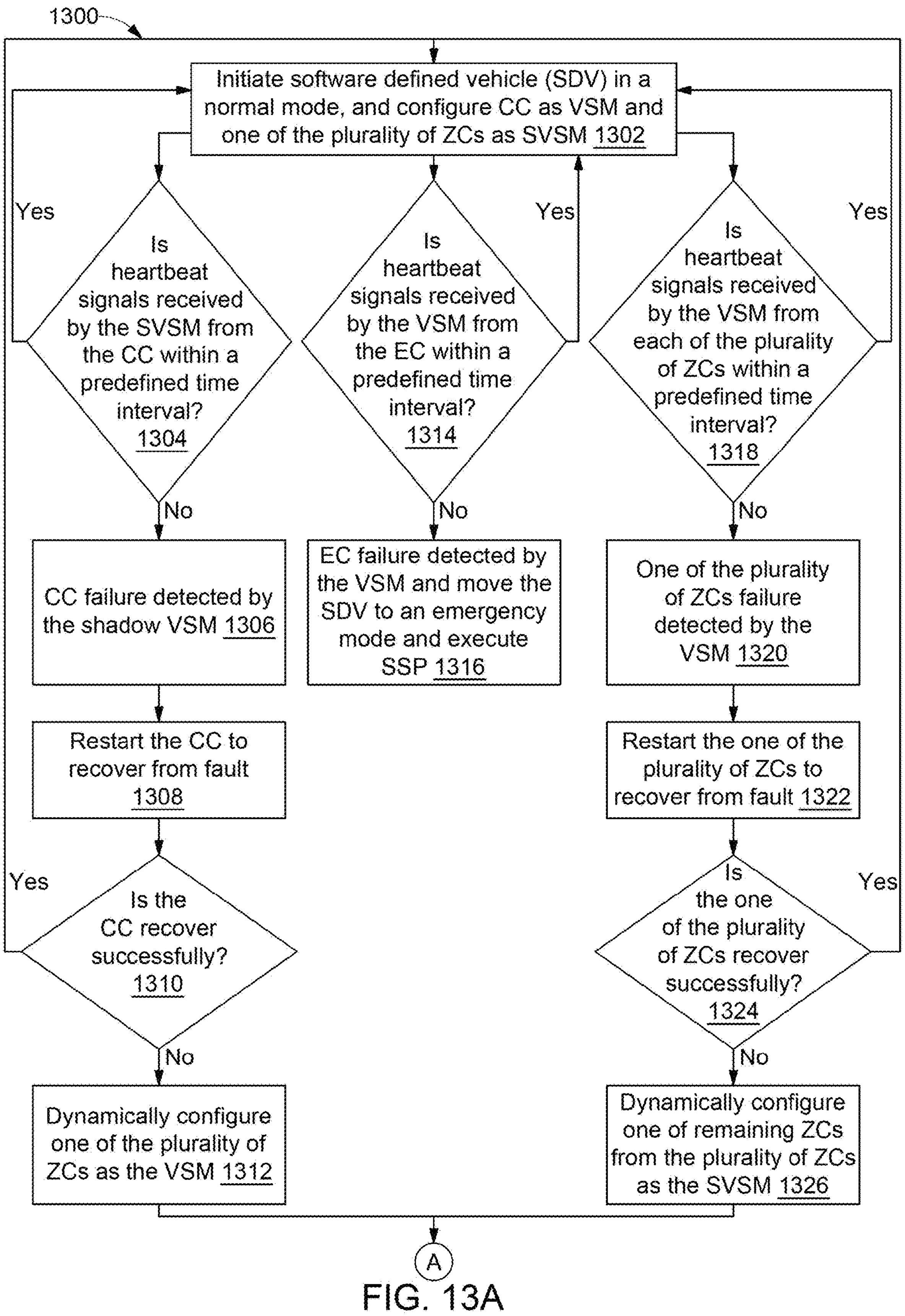
FIG. 13A and FIG. 13B illustrate a flowchart of a method for providing functional safety of controllers in the software defined vehicle, in accordance with an embodiment of the present disclosure.
Figure 13B:
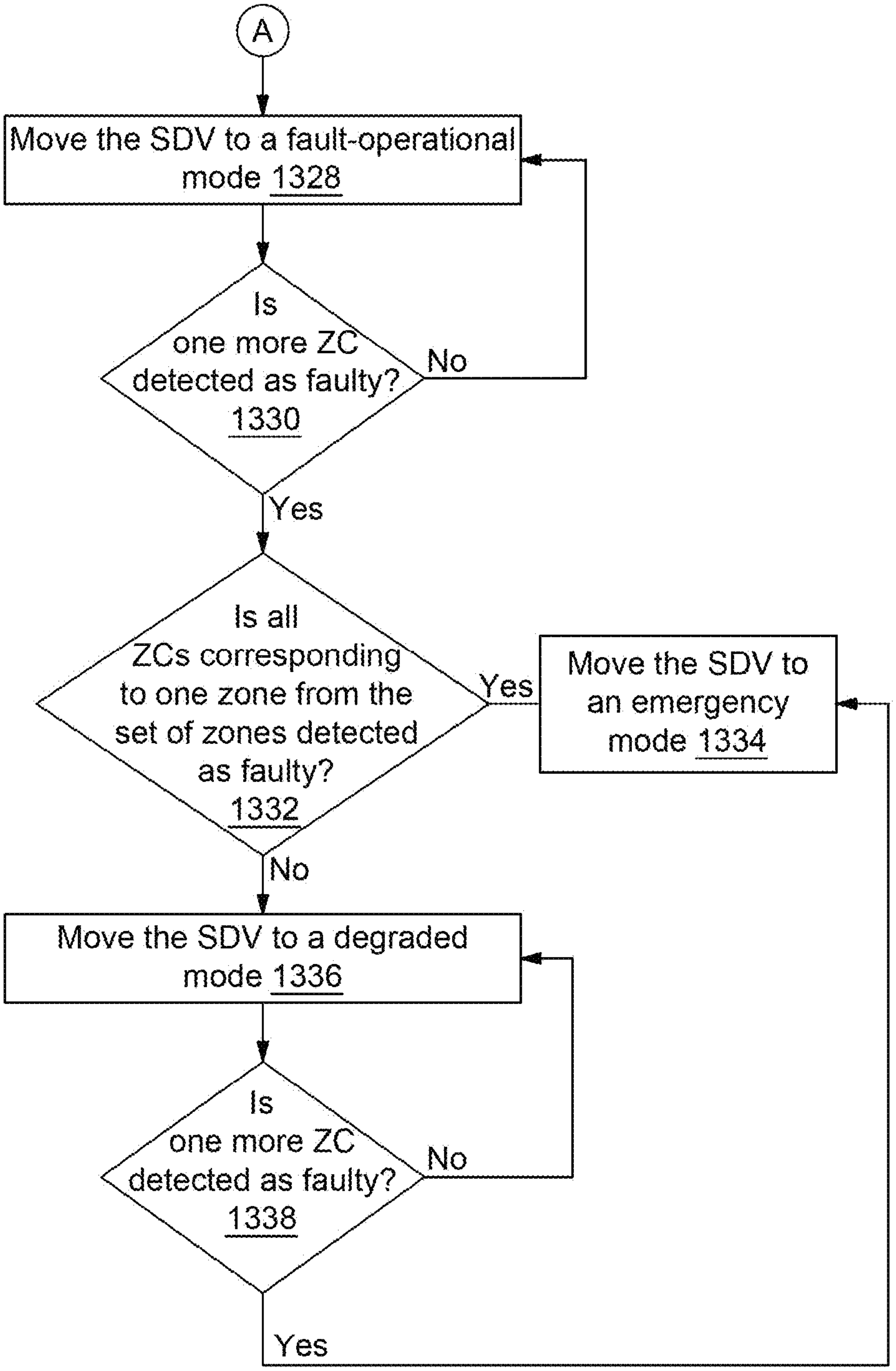

Referring now to FIG. 13A and FIG. 13B, a flowchart 1300 of a method for providing functional safety of controllers in the SDV 101 is illustrated, in accordance with an embodiment of the present disclosure. FIG. 13A and FIG. 13B are explained in conjunction with FIGS. 1-12. The flowchart 1300 may include a plurality of steps.

At step 1302, the SDV 101 may be initiated in a normal mode. It is to be noted that one of the plurality of modes of the SDV 101 may be determined to be the normal mode upon detection of the EC 106, the CC 102, and the plurality of ZCs 104A-104D as operational. In the normal mode, the CC 102 may be dynamically configured as the VSM, and one of the plurality of ZCs 104A-104D may be dynamically configured as the SVSM. In an embodiment, in order to determine the one of the plurality of modes of the SDV 101, a fault manager (master) of each of the plurality of ZCs 104A-104D transmit heartbeat signals to the VSM running on the CC 102 at regular intervals for monitoring health of each of the plurality of ZCs 104A-104D. In an embodiment, the heartbeat signals are transmitted via a primary network bus (e.g., ethernet network bus). Further in the normal mode, a fault manager (master) of the CC 102 transmits a heartbeat signal to the SVSM running on a ZC determined by a dynamic priority assignment technique, for monitoring the health of the CC 102. Additionally, the EC 106 also transmits a heartbeat signal to the VSM running on the CC 102 at regular intervals for monitoring the health of the EC 106. In the normal mode, the CC 102 may be dynamically configured as the VSM and one of the plurality of ZCs 104A-104D may be dynamically configured as the SVSM, based on a dynamic priority assignment technique.

Further at step 1304, the SVSM may determine if the heartbeat signal is received from the CC 102 within a predefined time interval. Upon receiving the heartbeat signal from the CC 102 within the predefined time interval, the SVSM continues the SDV 101 in the normal mode. However, if the SVSM fails to receive the heartbeat signal from the CC 102 within the predefined time interval, the SVSM, at step 1306, may determine a failure of the CC 102.

Further at step 1308, the SVSM may restart the CC 102 to recover from the failure. Further at step 1310, the SVSM may determine if the recovery is successful. If the recovery is successful, the SVSM continues the SDV 101 in the normal mode. However, if the recovery is not successful, the SVSM, at step 1312, dynamically configures the one of the plurality of ZCs 104A-104D as the VSM and one of remaining ZCs from the plurality of ZCs 104A-104D as the SVSM based on the dynamic priority assignment technique. Further at step 1328, the VSM may trigger a transition of the SDV 101 to a fault-operational mode Further at step 1314, the VSM may determine if heartbeat signal is received from the EC 106 within a predefined time interval. Upon receiving the heartbeat signal from the EC 106 within the predefined time interval, the VSM continues the SDV 101 in the normal mode. However, if the VSM fails to receive the heartbeat signal from the EC 106 within the predefined time interval, the VSM, at step 1316, may detect a failure of the EC 106 and may trigger a transition of the SDV 101 to an emergency mode and executes the SSP micro-service to safely stop the SDV 101. In the emergency mode, the CC 102 may be dynamically configured as the EC 106 and the VSM, and one of the plurality of ZCs 104A-104D may be dynamically configured as the SVSM.

Further at step 1318, the VSM may determine if the heartbeat signals are received from each of the plurality of ZCs 104A-104D within a predefined time interval. Upon receiving the heartbeat signal from each of the plurality of ZCs 104A-104D within the predefined time interval, the VSM continues the SDV 101 in the normal mode. However, if the VSM fails to receive the heartbeat signal from one of the plurality of ZCs 104A-104D within the predefined time interval, the VSM, at step 1320, may determine a failure of the one of the plurality of ZCs 104A-104D.

Further at step 1322, the VSM may restart the one of the plurality of ZCs 104A-104D to recover from the failure. Further at step 1324, the VSM may determine if the recovery is successful. If the recovery is successful, the VSM continues the SDV 101 in the normal mode. However, if the recovery is not successful, the VSM, at step 1326, dynamically configures one of remaining ZCs from the plurality of ZCs 104A-104D as the SVSM, based on a dynamic priority assignment technique.

Further at step 1328, the VSM may trigger a transition of the SDV 101 to the fault-operational mode. In the fault operational mode, in case the one of the ZCs configured as SVSM is detected as faulty, the CC 102 may be dynamically configured as the VSM. In the fault-operational mode, the VSM, at step 330, may determine if one more ZC from remaining of the plurality of ZCs 104A-104D also failed. If the one more ZC is not failed, the VSM continues the SDV 101 in the fault-operational mode. However, if the one more ZC from remaining of the plurality of ZCs 104A-104D is also failed, the VSM, at step 1332, may further determine if the all ZCs correspond to one zone from the set of zones as faulty. If all ZCs correspond to one zone from the set of zones as faulty, the VSM, at step 1334, triggers a transition to move the SDV 101 to the emergency mode and executes the SSP micro-service to bring the SDV 101 to safe stop. However, if all ZCs do not correspond to one zone from the set of zones as faulty, the VSM, at step 1336, triggers a transition to move the SDV 101 to a degraded mode. In the degraded mode, the CC 102 may be dynamically configured as the VSM, and one of operational ZCs corresponding to set of zones may be dynamically configured as the SVSM.

In the degraded mode, the VSM, at step 1338, determines if there is one more ZC failure. If the one more ZC failure is not determined as faulty, the VSM continues the SDV 101 in the degraded mode. However, if the one more ZC failure is determined as faulty, the VSM triggers a transition to move the SDV 101 to the emergency mode and executes the SSP micro-service to bring the SDV 101 to safe stop.

Thus, the disclosed method and system overcomes the limitations of existing vehicle architectures by introducing a robust, scalable, and functionally safe Software Defined Vehicle (SDV) framework. The method and system provide a fault-operational architecture, allowing the software defined vehicle to continue operating with full functionality even in the event of a fault in the controllers. The method and system introduce redundancy in the vehicle architecture, thereby ensuring efficient resource utilization across controllers. This redundancy optimizes the bandwidth usage of all HPCs for continuous data processing during vehicle operation. The method and system resolve the issue of single point failure within the software defined vehicle. By defining multiple vehicle modes based on the type and severity of faults, the system implements fault recovery mechanisms that allow the software defined vehicle to mitigate any potential hazards during vehicle operation.

The specification has described the method and system for ensuring functional safety in a software defined vehicle. The illustrated steps are set out to explain the exemplary embodiments shown, and it should be anticipated that ongoing technological development may change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) may be apparent to persons skilled in the relevant art(s) based on the teachings contained herein. Such alternatives fall within the scope and spirit of the disclosed embodiments.

Furthermore, one or more non-transitory computer-readable medium may be utilized in implementing embodiments consistent with the present disclosure. A non-transitory computer-readable medium refers to any type of physical memory on which information or data readable by a processor may be stored. Thus, a non-transitory computer-readable medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system for providing functional safety of controllers in a software defined vehicle (SDV), comprising:

a Central Controller (CC);

a plurality of Zonal Controllers (ZCs) coupled with the CC; and an Emergency Controller (EC) coupled to the CC and each of the plurality of ZCs, wherein the CC or one of the plurality of ZCs is dynamically configurable as a Vehicle Safety Monitor (VSM) and one of the plurality of ZCs is dynamically configurable as a shadow-VSM (SVSM), based on a determination of one of a plurality of modes of the SDV, and wherein the VSM is configured to monitor the EC and the plurality of ZCs and the SVSM is configured to monitor the VSM to determine the one of the plurality of modes of the SDV, wherein each of the plurality of ZCs are categorized into one of a set of zones of the SDV, wherein the SDV is determined to be in an emergency mode as the one of the plurality of modes based on one of:

upon detection of the EC as faulty, wherein in the emergency mode, the CC is dynamically configured as the EC and the VSM, and one of the plurality of ZCs is dynamically configured as the SVSM; and upon detection of all ZCs corresponding to one zone from the set of zones as faulty, wherein in the emergency mode, the CC is dynamically configured as the VSM, and one of the plurality of ZCs corresponding to remaining zones from the set of zones is dynamically configured as the SVSM.

2. The system of claim 1, wherein the SDV is determined to be in a normal mode as the one of the plurality of modes upon detection of the EC, the CC and the plurality of ZCs as operational, and wherein in the normal mode, the CC is dynamically configured as the VSM, and one of the plurality of ZCs is dynamically configured as the SVSM.

3. The system of claim 1, wherein the SDV is determined to be in a degraded mode as the one of the plurality of modes upon detection of one ZC corresponding to each of the set of zones as faulty, and wherein in the degraded mode, the CC is dynamically configured as the VSM, and one of operational ZCs corresponding to each of the set of zones is dynamically configured as the SVSM.

4. The system of claim 1, wherein the SDV is determined to be in a fault-operational mode as the one of the plurality of modes based on one of:

upon detection of the CC as faulty, wherein in the fault-operational mode, one of the plurality of ZCs is dynamically configured as the VSM, and one of remaining ZCs from the plurality of ZCs is dynamically configured as the SVSM; and upon detection of the CC and the EC as operational and one of the plurality of ZCs as faulty, wherein in the fault-operational mode, in case the one of the plurality of ZCs configured as SVSM as faulty, the CC is dynamically configured as the VSM and one of remaining ZCs from the plurality of ZCs is dynamically configured as the SVSM.

5. The system of claim 1, wherein the VSM is configured to periodically receive heartbeat signals from each of the plurality of ZCs and the EC in order to monitor the plurality of ZCs and the EC, wherein the SVSM is configured to periodically receive heartbeat signals from the VSM in order to monitor the VSM, and wherein the one of the plurality of modes of the SDV is determined based on:

not receiving the heartbeat signals by the VSM from at least one of: each of the plurality of ZCs or the EC, or not receiving the heartbeat signals by the SVSM from the VSM.

6. A method for providing functional safety of controllers in a software defined vehicle (SDV), the method comprising:

determining one of a plurality of modes of the SDV based on:

monitoring, by a Vehicle Safety Monitor (VSM), an Emergency Controller (EC) and a plurality of Zonal Controllers (ZCs) of the SDV; and monitoring, by a Shadow-VSM (SVSM), the VSM, wherein the SDV comprises a Central Controller (CC), wherein the plurality of ZCs are coupled with the CC, wherein the EC is coupled to the CC and each of the plurality of ZCs, and wherein the CC or one of the plurality of ZCs is dynamically configurable as the VSM and one of the plurality of ZCs is dynamically configurable as the SVSM, based on the determination of the one of the plurality of modes of the SDV, wherein each of the plurality of ZCs is categorized into one of a set of zones of the SDV, wherein the one of the plurality of modes of the SDV is determined to be an emergency mode based on one of:

upon detection of the EC as faulty, wherein, in the emergency mode, the CC is dynamically configured as the EC and the VSM, and one of the plurality of ZCs is dynamically configured as the SVSM; and upon detection of all ZCs corresponding to one zone from the set of zones as faulty, wherein, in the emergency mode, the CC is dynamically configured as the VSM, and one of the plurality of ZCs corresponding to remaining zones from the set of zones is dynamically configured as the SVSM.

7. The method of claim 6, wherein the one of the plurality of modes of the SDV is determined to be a normal mode upon detection of the EC, the CC and the plurality of ZCs as operational, and wherein in the normal mode, the CC is dynamically configured as the VSM, and one of the plurality of ZCs is dynamically configured as the SVSM.

8. The method of claim 6, wherein the one of the plurality of modes of the SDV is determined to be a degraded mode upon detection of one ZC corresponding to each of the set of zone as faulty, and wherein in the degraded mode, the CC is dynamically configured as the VSM, and one of operational ZCs corresponding to each of the set of zones is dynamically configured as the SVSM.

9. The method of claim 6, wherein the one of the plurality of modes of the SDV is determined to be a fault-operational mode based on one of:

upon detection of the CC as faulty, wherein in the fault-operational mode, one of the plurality of ZCs is dynamically configured as the VSM, and one of remaining ZCs from the plurality of ZCs is dynamically configured as the SVSM; and upon detection of the CC and the EC as operational and one of the plurality of ZCs as faulty, wherein in the fault-operational mode, in case the one of the ZCs configured as SVSM as faulty, the CC is dynamically configured as the VSM and one of remaining ZCs from the plurality of ZCs is dynamically configured as the SVSM.

10. The method of claim 6, wherein the VSM is configured to periodically receive heartbeat signals from each of the plurality of ZCs and the EC in order to monitor the plurality of ZCs and the EC, wherein the SVSM is configured to periodically receive heartbeat signals from the VSM in order to monitor the VSM, and wherein the one of the plurality of modes of the SDV is determined based on:

not receiving the heartbeat signals by the VSM from at least one of: each of the plurality of ZCs or the EC, or not receiving the heartbeat signals by the SVSM from the VSM.

11. A non-transitory computer-readable medium storing computer-executable instructions for providing functional safety of controllers in a software defined vehicle (SDV), the computer-executable instructions configured for:

dynamically configuring a Central Controller (CC) or one of a plurality of Zonal Controllers (ZCs) as a Vehicle Safety Monitor (VSM) and dynamically configuring one of the plurality of ZCs as a shadow-VSM (SVSM), based on a determination of one of a plurality of modes of the SDV;

monitoring, by the VSM, an Emergency Controller (EC) and the plurality of ZCs and monitoring, by the SVSM, the VSM to determine the one of the plurality of modes of the SDV, wherein the SDV comprises the CC, the plurality of ZCs coupled with the CC, and the EC coupled to the CC and each of the plurality of ZCs;

categorizing each of the plurality of ZCs into one of a set of zones of the SDV; and determining the one of the plurality of modes of the SDV to be an emergency mode based on one of:

upon detection of the EC as faulty, wherein in the emergency mode, the CC is dynamically configured as the EC and the VSM, and one of the plurality of ZCs is dynamically configured as the SVSM; and upon detection of all ZCs corresponding to one zone from the set of zones as faulty, wherein in the emergency mode, the CC is dynamically configured as the VSM, and one of the plurality of ZCs corresponding to remaining zones from the set of zones is dynamically configured as the SVSM.

12. The non-transitory computer-readable medium of claim 11, wherein the one of the plurality of modes of the SDV is determined to be a normal mode upon detection of the EC, the CC and the plurality of ZCs as operational, and wherein in the normal mode, the CC is dynamically configured as the VSM, and one of the plurality of ZCs is dynamically configured as the SVSM.

13. The non-transitory computer-readable medium of claim 11, wherein the one of the plurality of modes of the SDV is determined to be a degraded mode upon detection of one ZC corresponding to each of the set of zone as faulty, and wherein in the degraded mode, the CC is dynamically configured as the VSM, and one of operational ZCs corresponding to each of the set of zones is dynamically configured as the SVSM.

14. The non-transitory computer-readable medium of claim 11, wherein the one of the plurality of modes of the SDV is determined to be a fault-operational mode based on one of:

upon detection of the CC as faulty, wherein in the fault-operational mode, one of the plurality of ZCs is dynamically configured as the VSM, and one of remaining ZCs from the plurality of ZCs is dynamically configured as the SVSM; and upon detection of the CC and the EC as operational and one of the plurality of ZCs as faulty, wherein in the fault-operational mode, in case the one of the ZCs configured as SVSM as faulty, the CC is dynamically configured as the VSM and one of remaining ZCs from the plurality of ZCs is dynamically configured as the SVSM.

15. The non-transitory computer-readable medium of claim 11, wherein the VSM is configured to periodically receive heartbeat signals from each of the plurality of ZCs and the EC in order to monitor the plurality of ZCs and the EC, wherein the SVSM is configured to periodically receive heartbeat signals from the VSM in order to monitor the VSM, and wherein the one of the plurality of modes of the SDV is determined based on:

not receiving the heartbeat signals by the VSM from at least one of: each of the plurality of ZCs or the EC, or not receiving the heartbeat signals by the SVSM from the VSM.

* * * * *